US012700004B2

(12) United States Patent
Singh et al.

(10) Patent No.: US 12,700,004 B2
(45) Date of Patent: Aug. 4, 2026

(54) SYSTEMS AND METHODS FOR PREVENTING FRAUD IN TRANSACTIONS IN REAL-TIME

(71) Applicant: FMR LLC, Boston, MA (US)

(72) Inventors: Harsh Vardhan Singh, Edison, NJ (US); Sanjeev Dhupkar, Cary, NC (US); Man Hei Raymond Yim, Cambridge, MA (US); Nishant Mehta, Jersey City, NJ (US); Phanindra Grandhi, East Brunswick, NJ (US); Sandeep Bagde, South Plainfield, NJ (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/761,911

(22) Filed: Jul. 2, 2024

(65) Prior Publication Data

US 2026/0010906 A1 Jan. 8, 2026

(51) Int. Cl.
G06Q 20/40 (2012.01)
H04L 9/06 (2006.01)
H04L 9/40 (2022.01)

(52) U.S. Cl.
CPC ....... G06Q 20/4016 (2013.01); H04L 9/0643 (2013.01); H04L 63/0823 (2013.01)

(58) Field of Classification Search
None
See application file for complete search history.

(56) References Cited

U.S. PATENT DOCUMENTS

| | | | |
|---|---|---|---|
| 11,238,449 B2 * | 2/2022 | Fedorov | H04L 63/0823 |
| 11,711,286 B2 * | 7/2023 | Novotny | H04L 43/50 |
| 2015/0356562 A1 * | 12/2015 | Siddens | G06Q 20/4016 705/44 |
| 2021/0110405 A1 * | 4/2021 | Light | H04L 9/3247 |

* cited by examiner

*Primary Examiner* — Bennett M Sigmond
*Assistant Examiner* — Bhavin D Shah
(74) *Attorney, Agent, or Firm* — Cesari and McKenna, LLP

(57) ABSTRACT

Systems and methods are described for preventing fraud in transactions in real-time. A first computing device associated with an issuing authority may generate compliance certificates including one or more restriction rules that prohibit specific transactions from being executed by an entity that is regulated by the issuing authority. When a user requests a second computing device associated with the entity to perform a transaction, the second computing device determines whether it can execute the transaction in the request in view of the one or more restriction rules in the compliance certificate. In case the transaction includes attributes that would violate at least one of the one or more restriction rules, the second computing device rejects or blocks the transaction. On the other hand, in the case, the transaction includes attributes that does not violate any of the one or more restriction rules, the second computing device executes the transaction.

19 Claims, 14 Drawing Sheets

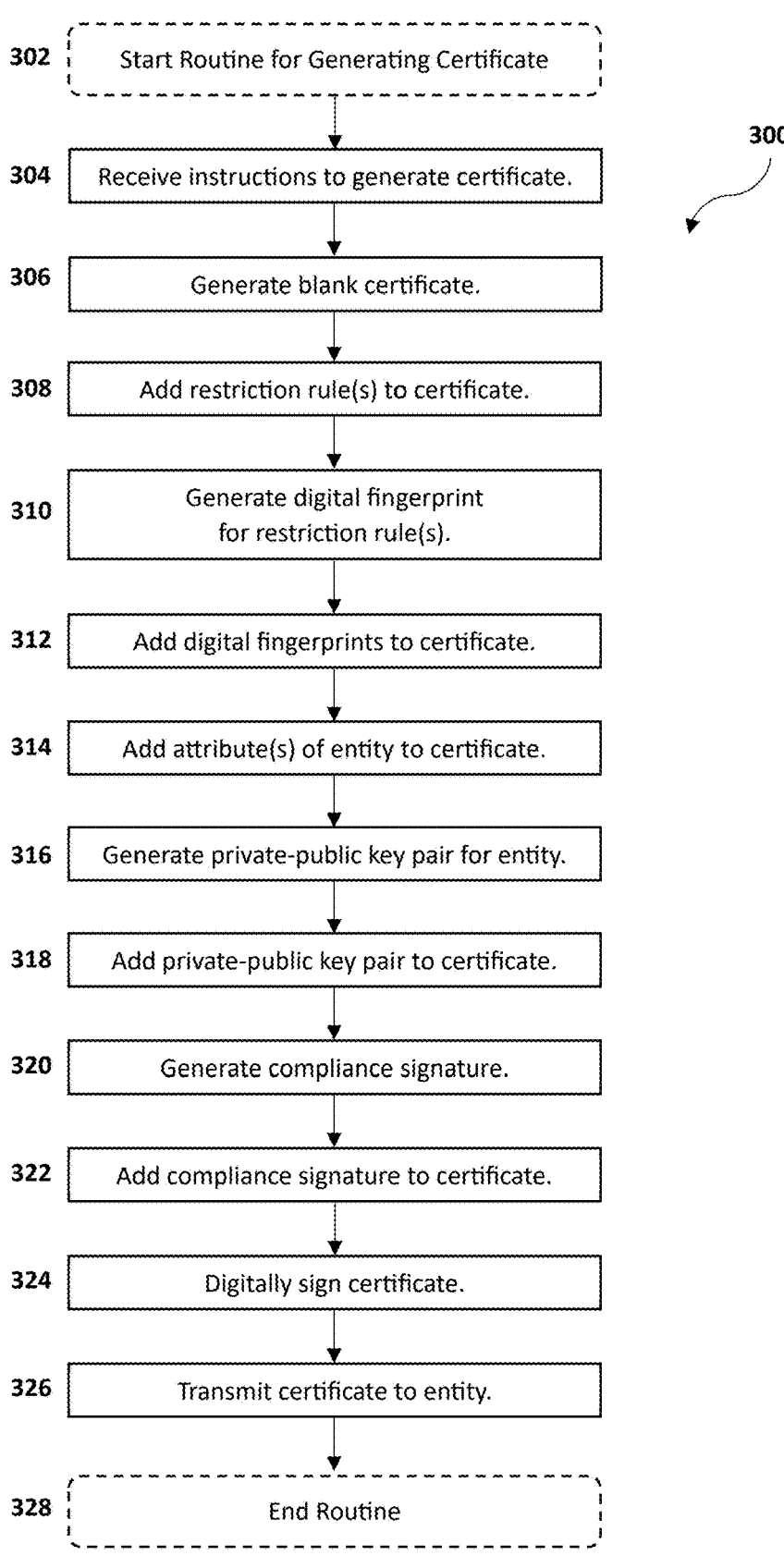

302  Start Routine for Generating Certificate

300

304  Receive instructions to generate certificate.

306  Generate blank certificate.

308  Add restriction rule(s) to certificate.

310  Generate digital fingerprint
     for restriction rule(s).

312  Add digital fingerprints to certificate.

314  Add attribute(s) of entity to certificate.

316  Generate private-public key pair for entity.

318  Add private-public key pair to certificate.

320  Generate compliance signature.

322  Add compliance signature to certificate.

324  Digitally sign certificate.

326  Transmit certificate to entity.

328  End Routine

FIG. 3

Compliance Certificate 602

- Entity Being Issued Certificate
- Domain associated with Entity
- Subdomain associated with Entity
- Private-Public Key Pair assigned (and unique) to Entity
- Issuing Authority
- Issuing Authority's Digital Signature
- Restriction Rule(s)
- Expiration Date
- Date of Issue
- Authentication Information

Compliance Certificate 604

- Entity Being Issued Certificate
- Domain associated with Entity
- Subdomain associated with Entity
- Private-Public Key Pair assigned (and unique) to Entity
- Issuing Authority
- Issuing Authority's Digital Signature
- Restriction Rule(s)
- Expiration Date
- Date of Issue
- Authentication Information

Compliance Certificate 606

- Entity Being Issued Certificate
- Domain associated with Entity
- Subdomain associated with Entity
- Private-Public Key Pair assigned (and unique) to Entity
- Issuing Authority
- Issuing Authority's Digital Signature
- Restriction Rule(s)
- Expiration Date
- Date of Issue
- Authentication Information Entity 608

Entity 610

Entity 612

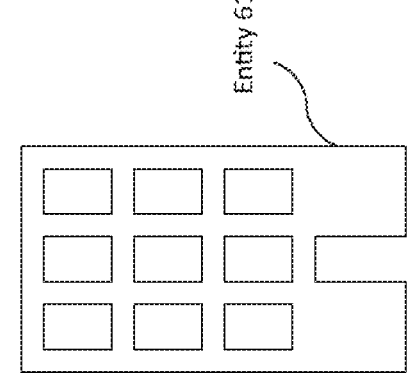

702   Start Routine for Authenticating Certificate

704   Receive compliance certificate from issuing authority.

706   Authenticate certificate based on digital signature of compliance certificate.

708   Authenticate digital fingerprint associated with restriction rule(s) in the certificate.

710   Store certificate.

712   End Routine

Transaction Receipt

| | |
|---|---|
| Transaction Hash | 0x51125d031...4e8f60 |
| Trade Type | Buy |
| Order Type | Market |
| Trade Pair 1 | BTC |
| Trade Pair 2 | ETH |
| Quantity 1 | 2.00 |
| Quantity 2 | 1.20 |
| Timestamp | Oct-11-2023 06:29:35 PM +UTC |
| | |
| Signed Token Master Hash | Oxyuh122...111 |
| Signed Country Master Hash | Oxdwuh122...123 |
| Signed Wallet Master Hash | Oxwde2224...154 |
| Transaction Receipt Hash | Oxcdfg442...674 |
| Transaction Signature | Oxcdfg442...6sdss4 |
| Transaction ID | 123 |
| Fee Amount | 0.00020 |
| Fee Currency | ETH |
| Buyer Wallet Address | xx12345 |
| Seller Wallet Address | xx12344 |
| Entity Name | CryptoExchangeABC |
| Entity Public Key | Oxcdzdsds4433...674 |

1102    Start Routine for Validating Transaction

1104    Receive request to validate transaction(s).

1106    Determine whether transaction(s) violates restriction rule(s).

1108    Generate validation report specifying transaction(s) that comply with the restriction rule(s) and transaction(s) that violate the restriction rule(s).

1110    Transmit validation report.

1112    End Routine

| Validation Report | | |
|---|---|---|
| Transaction ID | Transaction Attributes | Compliant? |
| Trade 1 | Detail 1 | Yes |
| Trade 2 | Detail 2 | Yes |
| Trade 3 | Detail 3 | No |
| Trade 4 | Detail 4 | Yes |
| Trade 5 | Detail 5 | Yes |
| Trade 6 | Detail 6 | Yes |
| Trade 7 | Detail 7 | Yes |
| Trade 8 | Detail 8 | No |
| Trade 9 | Detail 9 | No |

Processor 1302B

Network Interface 1304B

Computer Readable Medium Drive 1306B

Input/Output Device Interface 1308B

Memory 1310B

Operating System 1312B

Certificate Management Module 1314B

Transaction Processing Module 1316B

SYSTEMS AND METHODS FOR PREVENTING FRAUD IN TRANSACTIONS IN REAL-TIME

TECHNICAL FIELD

This application relates generally to systems and methods, including computer program products, for preventing fraud in transactions in real-time.

BACKGROUND

The advent of blockchain technology has resulted in many unprecedented applications, such as cryptocurrencies. Unlike fiat currencies (e.g., U.S. dollar, Euro, Yen, etc.), which are issued solely by governments, cryptocurrencies can be created by anyone, whether it be an individual, an organization, or even the governments themselves. Further, due to their digital nature, cryptocurrencies are inexpensive to create and can be distributed rapidly and easily. In addition, cryptocurrencies allow for secure, encrypted, and anonymous transactions between participants (a popular feature for those who wish to remain unidentified). Moreover, cryptocurrencies can also be traded with fiat currencies, thereby demonstrating their flexibility in daily usage.

Due to these features, cryptocurrencies have become extremely popular within the past decade. Consequently, many types of cryptocurrencies (e.g., Bitcoin, Ethereum, Dogecoin, etc.) have quickly proliferated throughout the world. In fact, there are now more than tens of thousands of cryptocurrencies that are actively being exchanged or traded every day. As such, many market exchanges have emerged to respond to the demand for a centralized (virtual) location for allowing transactions of cryptocurrencies (or fiat currencies) among hundreds of millions cryptocurrency owners.

Nevertheless, the unique features offered by cryptocurrencies have also led to a number of fraudulent activities, such as money laundering or scams. For example, countries under sanctions may be unable to perform ordinary transactions using banks or fiat currencies (e.g., Russia being cut off from the SWIFT (Society for Worldwide Interbank Financial Telecommunication) payment system after invading Ukraine or North Korea being unable to trade with multiple countries due to human rights issues). As a result, by using cryptocurrencies to anonymously pay for goods or services rendered, the sanctioned countries may be able to sidestep or circumvent the sanctions. Likewise, drug cartels may also utilize cryptocurrencies for similar reasons, so as to hide their illicit gains. In fact, market exchanges provide good opportunities to hide such illicit transactions since there are large volumes of traders performing transactions throughout the day.

In addition to providing an avenue for performing fraud, such as money laundering, cryptocurrencies may also themselves be violating laws and regulations. For example, many cryptocurrencies have been deemed securities under the "Howey test." See Securities and Exchange Commission v. W. J. Howey Co., 328 U.S. 293 (1946). As a result, such cryptocurrencies are required to be registered with the SEC (Securities and Exchange Commission). Any unregistered cryptocurrency is therefore considered illegal. Further, cryptocurrencies may also be subject to additional regulation by other regulators, such as FINRA (Financial Industry Regulatory Authority) and ESMA (European Securities and Markets Authority). As such, even if a cryptocurrency was not deemed a security under the "Howey test," the cryptocurrency may be still illegal for violating other regulation (and therefore forbidden from being used in transactions).

As such, regulators may promulgate announcements that forbid transactions with addresses of cryptocurrency wallets known to be used for fraud (e.g., money laundering) and/or associated with sanctioned individuals and/or individuals (or governments) of sanctioned nations. Likewise, regulators may also promulgate announcements that forbid transactions of cryptocurrencies that are known to violate laws and regulations. As a result, organizers (or managers) of the market exchanges are required to comply with the requirements set forth in such promulgated announcements. Nevertheless, such compliance by the market exchanges is often difficult, which stems from the cumbersome process of promulgation, in which announcements are promulgated randomly without advanced notice. Further, the announcements may be promulgated on a public platform (e.g., SEC website), such that it would be necessary to monitor such platform every moment to ensure compliance with all the necessary requirements in the announcements. Therefore, it may be possible that some organizers of market exchanges may accidentally overlook such announcements. Further, even if the organizers were to become aware of such announcements, it would take a significant amount of time to implement such new requirements in the announcements into the systems facilitating the transactions of the market exchanges. Due to the inefficiencies of such process, many transactions that violate laws and regulations or are considered to be fraud are able to transpire within the market exchanges. As such there remains a need for a better process to ensure that fraud does not occur in market exchanges.

SUMMARY

The present disclosure, in one aspect, features a computing (or computer) system for preventing fraud in transactions in real-time by a market exchange, the system comprising a server computing device having a memory for storing computer-executable instructions and a processor that executes the computer-executable instructions to: receive a compliance certificate from an issuing authority, which includes one or more restriction rules that determine which transactions are capable of being performed without being identified as fraudulent, wherein each of the one or more restriction rules includes a digital fingerprint that allows the respective restriction rule to be authenticated; receive requests to execute one or more transactions, wherein each of the one or more transactions includes one or more attributes; execute a first transaction of the one or more transactions after determining that the first transaction complies with the one or more restriction rules in the compliance certificate; and generate a transaction receipt after the execution of the first transaction, the transaction receipt including a compliance signature, which certifies the first transaction as having complied with the one or more restriction rules.

The one or more attributes of at least one of the one or more transactions includes at least one of a first party, a second party, a first asset, and a second asset, and wherein the at least one of the one or more transactions identifies an exchange between the first asset associated with the first user and a second asset associated with the second user. The transaction receipt is transmitted to the first party and the second party when a transaction associated with both the first party and the second party has been executed. The computing (or computer) system rejects a second transaction of the one or more transactions as fraudulent after determining that the second transaction violates at least one of the one or more restrictions rules, wherein a fraud notification is transmitted to the issuing authority indicating that an attempt at a fraudulent transaction has been detected and successfully blocked. The computing (or computer) system receives an updated compliance certificate from the issuing authority, wherein the updated compliance certificate includes one or more updated restriction rules, and wherein at least one of the one or more updated restriction rules are different from the one or more restriction rules. The first transaction is determined to be compliant according to the one or more restriction rules and is determined to be fraudulent according to the updated one or more restriction rules. The second transaction is determined to be fraudulent according to the one or more restriction rules and is determined to be compliant with the updated one or more restriction rules.

The present disclosure, in another aspect, features a non-transitory computer-readable medium to receive a compliance certificate from an issuing authority, which includes one or more restriction rules that determine which transactions are capable of being performed without being identified as fraudulent, wherein each of the one or more restriction rules includes a digital fingerprint that allows the respective restriction rule to be authenticated; receive requests to execute one or more transactions, wherein each of the one or more transactions includes one or more attributes; execute a first transaction of the one or more transactions after determining that the first transaction complies with the one or more restriction rules in the compliance certificate; and generate a transaction receipt after the execution of the first transaction, the transaction receipt including a compliance signature, which certifies the first transaction as having complied with the one or more restriction rules.

The compliance certificate further includes a private key. The non-transitory computer-readable medium digitally signs the transaction receipt using the private key included in the compliance certificate. The non-transitory computer-readable medium authenticates the compliance certificate issued by the issuing authority, wherein a private key of the issuing authority is used to generate a digital signature of the compliance certificate, and wherein authentication is performed by using a public key associated with the issuing authority to verify whether the private key of the issuing authority was used to generate digital signature. The compliance signature is generated by the issuing authority signing one or more restriction rule hashes using a private key of the issuing authority, and wherein each restriction rule hash is generated by hashing a respective restriction rule of the one or more restriction rules according to a hashing algorithm. Each of the digital fingerprints associated with the one or more restriction rules is generated by hashing a respective restriction rule according to a hashing algorithm, and wherein the hashing algorithm used to generate each of the digital fingerprints is different from the hashing algorithm used to generate each restriction rule hash. The non-transitory computer-readable medium authenticates the one or more restriction rules in the compliance certificate, wherein authentication of the one or more restriction rules is performed by hashing each of the one or more restrictions rules, according to the same hashing algorithm used to hash the digital fingerprint, to determine whether each hashed restriction rule is equivalent to a respective digital fingerprint. At least one of the digital fingerprints and the restriction rule hashes are generated using a hashing algorithm from one of the following hashing algorithm families: MD5, SHA-0, SHA-1, SHA-2, and Keccak including SHA-3.

The present disclosure, in another aspect, features a computerized method for preventing fraud in transactions in real-time. The method comprises receiving a compliance certificate from an issuing authority, which includes one or more restriction rules that determine which transactions are capable of being performed without being identified as fraudulent, wherein each of the one or more restriction rules includes a digital fingerprint that allows the respective restriction rule to be authenticated; receiving requests to execute one or more transactions, wherein each of the one or more transactions includes one or more attributes; executing a first transaction of the one or more transactions after determining that the first transaction complies with the one or more restriction rules in the compliance certificate; and generating a transaction receipt after the execution of the first transaction, the transaction receipt including a compliance signature, which certifies the first transaction as having complied with the one or more restriction rules. The issuing authority is a regulatory government agency, a self-regulating organization, or a private company. The one or more restrictions rules prevent transactions with at least one of entities associated with one or more particular countries, entities associated with one or more particular digital addresses of a digital wallet, one or more tokens, one or more currencies, and one or more financial instruments. The one or more currencies include at least one of fiat currencies and cryptocurrencies, and wherein the one or more financial instruments include securities, commodities, futures, and options contracts. The compliance certificate further includes at least one of an entity to whom the compliance certificate is being issued, public key associated with the entity, private key associated with the entity, domain name associated with the entity, subdomains associated with the entity, issuing authority who is issuing the compliance certificate, digital signature of the issuing authority, issue date of the compliance certificate, and expiry date of the compliance certificate. The issuing authority regulates two or more market exchanges, wherein the issuing authority issues unique compliance certificates to each of the two or more market exchanges, and wherein each of the issued unique compliance certificates includes the same one or more restriction rules.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method for generating a compliance certificate.

FIG. 6 is an example of diagram illustrating the feature of distributing compliance certificates having one or more attributes to respective entities.

FIG. 9 is an example of diagram illustrating the feature of a transaction receipt that is generated after a transaction has been executed.

FIG. 12 is an example of diagram illustrating the feature of a validation report that includes determinations of whether one or more executed transactions are compliant with one or more restriction rules and whether one or more executed transactions violate the one or more restriction rules.

DETAILED DESCRIPTION

Figure 1:
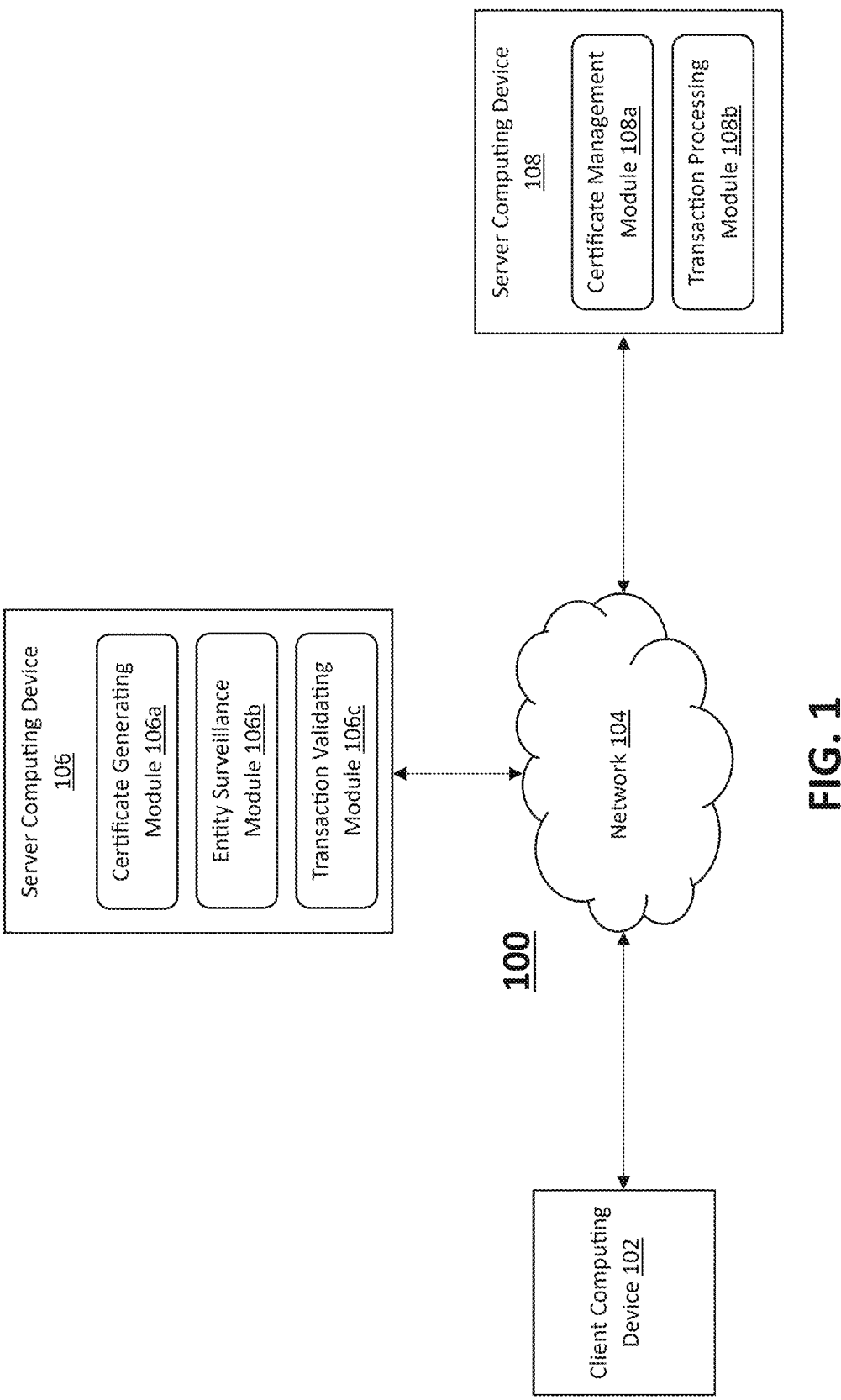
FIG. 1 is a block diagram of a system for preventing fraud in transactions in real-time.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a block diagram of a system for 100 for preventing fraud in transactions in real-time. System 100 includes a client computing device 102, a communication network 104, a server computing device 106, and a server computing device 108.

The client computing device 102 can be coupled to a display device (not shown), such as a monitor, display panel, or screen. For example, client computing device 102 can provide a graphical user interface (GUI) via the display device to a user of corresponding device that presents output resulting from the methods and systems described herein and receives input from the user for further processing. Exemplary client computing device 102 include but are not limited to desktop computers, laptop computers, tablets, mobile devices, smartphones, smart watches, Internet-of-Things (IoT) devices, and internet appliances. It should be appreciated that other types of client computing devices that are capable of connecting to components of the system 100 can be used without departing from the scope of invention. Although FIG. 1 depicts a single client computing device 102, it should be appreciated that system 100 can include any number of client computing devices 102.

Communication network 104 allows communication among the server computing device 106, the server computing device 108, the client computing device 102, and one or more other remote computing devices (not shown). In some embodiments, client computing device 102 is similarly connected to the network 104 in order to communicate with the server computing device 106 (or the server computing device 108). The communication network 104 is typically a wide area network, such as the Internet and/or a cellular network. In some embodiments, the communication network 104 is comprised of several discrete networks and/or sub-networks (e.g., cellular to Internet).

The server computing device 106 is a device including specialized hardware and/or software modules that execute on a processor and interact with memory modules of the server computing device 106, to transmit data to other components of the system 106, to receive data from other components of the system 100, and perform functions for preventing fraud in transactions in real-time, as described herein. The server computing device 106 includes several systems, frameworks, stores, and computing modules that execute on one or more processors of the server computing device 106. For example, the server computing device 106 includes a certificate generating module 106a, an entity surveillance module 106b, and a transaction validating module 106c. In some embodiments, the certificate generating module 106a, the entity surveillance module 106b, and the transaction validating module 106c are specialized sets of computer software instructions programmed onto one or more dedicated processors in server computing device 106 and can include specifically-designated memory locations and/or registers for executing the specialized computer software instructions.

The server computing device 108 is a device including specialized hardware and/or software modules that execute on a processor and interact with memory modules of the server computing device 108, to transmit data to other components of the system 108, to receive data from other components of the system 100, and perform functions for preventing fraud in transactions in real-time, as described herein. The server computing device 108 includes several systems, frameworks, stores, and computing modules that execute on one or more processors of the server computing device 108. For example, the server computing device 108 includes a certificate management module 108a and a transaction processing module 108b. In some embodiments, the certificate management module 108a and the transaction processing module 108b are specialized sets of computer software instructions programmed onto one or more dedicated processors in server computing device 106 and can include specifically-designated memory locations and/or registers for executing the specialized computer software instructions.

Although the certificate generating module 106a, the entity surveillance module 106b, and the transaction validating module 106c are shown in FIG. 1 as executing within the same server computing device 106, in some embodiments the functionality of the certificate generating module 106a, the entity surveillance module 106b, and the transaction validating module 106c can be distributed among a plurality of server computing devices. As shown in FIG. 1, the server computing device 106 allows the certificate generating module 106a, the entity surveillance module 106b, and the transaction validating module 106c to communicate with each other in order to exchange data for the purpose of performing the described functions.

Likewise, although the certificate management module 108a and the transaction processing module 108b are shown in FIG. 1 as executing within the same server computing device 108, in some embodiments the functionality of the certificate management module 108a and the transaction processing module 108b can be distributed among a plurality of server computing devices. As shown in FIG. 1, the server computing device 106 allows the certificate management module 108a and the transaction processing module 108b to communicate with each other in order to exchange data for the purpose of performing the described functions.

It should be appreciated that any number of computing devices, arranged in a variety of architectures, resources, and configurations (e.g., cluster computing, visual computing, cloud computing) can be used without departing from the scope of the invention. Exemplary functionality of the certificate generating module 106a, the entity surveillance module 106b, the transaction validating module 106c, the certificate management module 108a, and the transaction processing module 108b are described in detail below.

Generally, in the system 100, a client computing device 102, may include one or more applications that provide additional functionality to the client computing device 102. For example, the client computing device 102 may include an application (or app) that allows the client computing device 102 to access the services provided by the server computing device 106 (or the server computing device 108). In another example, the client computing device 102 may include a browser application that allows access to the services provided by the server computing device 106 (or the server computing device 108) via a website, which can be reached by entering a uniform resource locator (URL).

Figure 2:
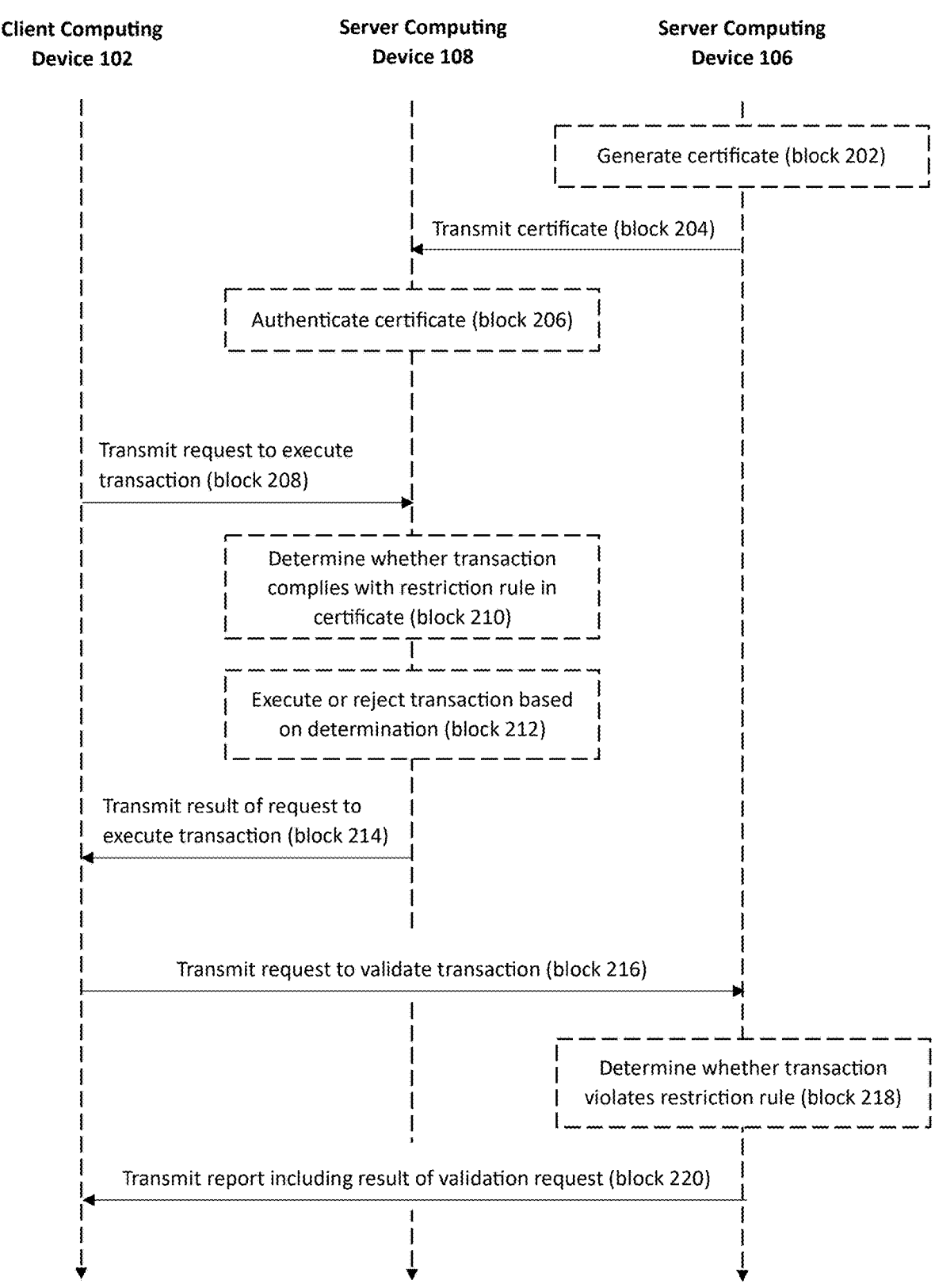
FIG. 2 is a system flow diagram for preventing fraud in transactions in real-time.

FIG. 2 illustrates an exemplary flow diagram corresponding to the system 100 of FIG. 1, in which the client computing device 102, the server computing device 106, and the server computing device 108, communicate with each other to perform one or more actions. At block 202, the server computing device 106 generates a compliance certificate. At block 204, the server computing device 106 transmits the compliance certificate to the server computing device 108 (blocks 204 and 206 are explained in more detail with respect to FIG. 3). At block 206, the server computing device 108 authenticates the compliance certificate (block 206 is explained in more detail with respect to FIG. 7). At block 208, the client computing device 102 transmits a request to execute a transaction (e.g., based on user instructions). At block 210, the server computing device 108 determines whether the transaction complies with the restriction rules set forth in the compliance certificate. At block 212, the server computing device 108 executes or rejects (or blocks) the transaction based on the previous determination. At block 214, the server computing device 108 transmits the results of request to execute transaction to the client computing device 102 (blocks 210, 212, and 214 are explained in more detail with respect to FIG. 8). At block 216, the client computing device 102 transmits a request to validate one or more transactions. At block 218, the server computing device 108 determines whether the one or more transactions violates a restriction rule. At block 220, the server computing device 108 transmits a report including results of the validation request (blocks 216, 218, and 220 are explained in more detail with respect to FIG. 11).

Example Routine for Generating Certificate

Figure 13A:
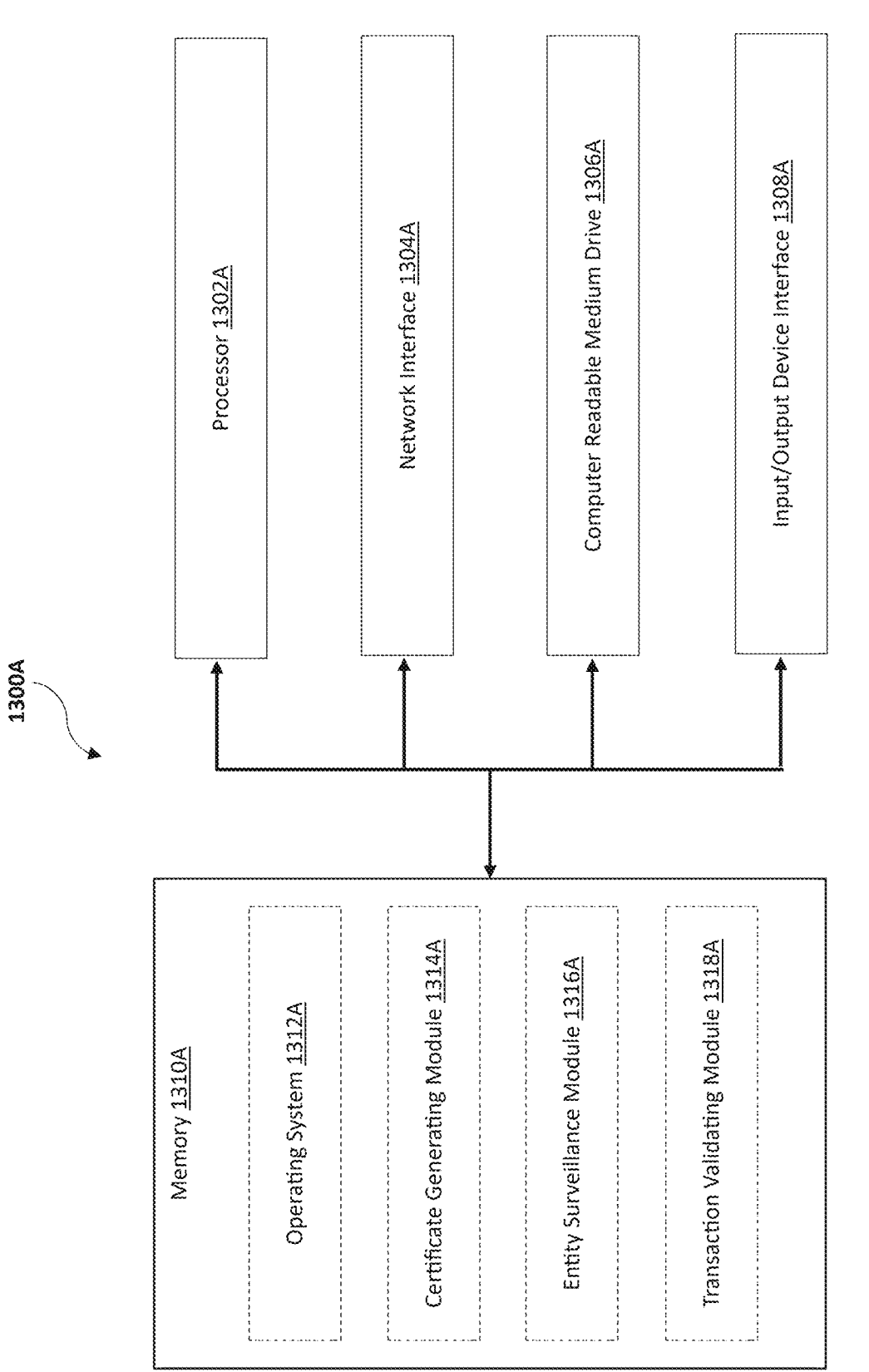
FIG. 13A is a diagram of an illustrative computing system.
Figure 13B:
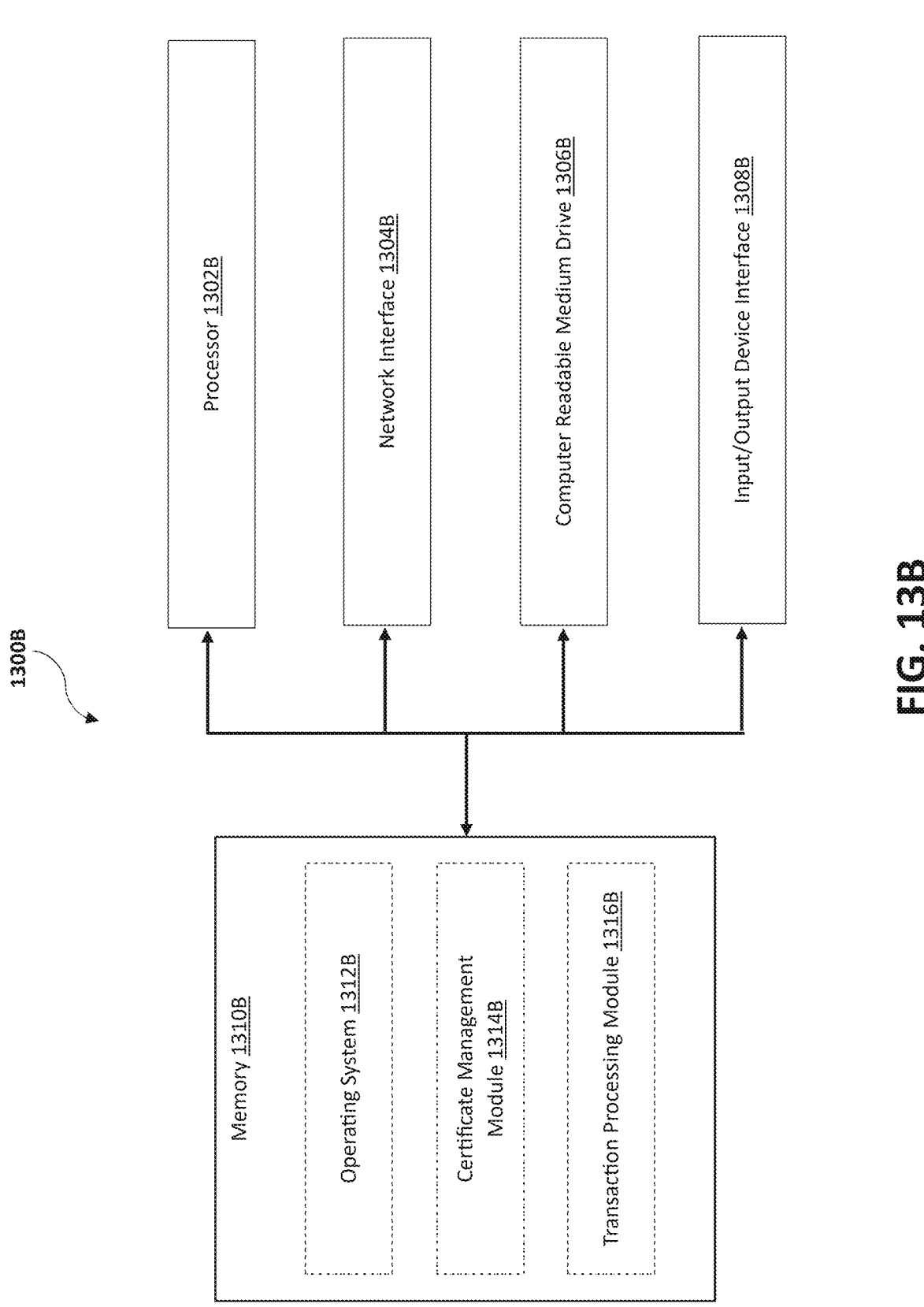
FIG. 13B is a diagram of another illustrative computing system.

When a routine described herein (i.e., 300, 700, 800, 1000, and 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300A shown in FIG. 13A or the computing device 1300B shown in FIG. 13B, and executed by one or more processors. In some embodiments, the routine

300, 700, 800, 1000, and 1100, or portions thereof may be implemented on multiple processors, serially or in parallel.

FIG. 3 illustrates example routine 300 (beginning at block 302) for generating a compliance certificate, that is performed, for example, by the certificate generating module 106a. The compliance certificate may be generated by an issuing authority, such as a regulator, who may be responsible for determining laws and/or regulations with respect to performing transactions. For example, the regulator may be a government agency, such as the SEC (Securities and Exchange Commission), or a private company acting as a self-regulatory organization (e.g., regulates an industry or profession, such as brokerage firms or exchange markets), such as FINRA (Financial Industry Regulatory Authority). Further, the regulator may also regulate entities, such as market exchanges as well. Market exchanges are organized markets where one or more assets (e.g., cryptocurrency, crypto token, financial instruments (e.g., securities, commodities, foreign exchange, futures, and options contracts) and fiat currency) can be purchased and sold. It should be noted that the term cryptocurrency, as used herein, may represent any asset (in digital form) that is associated with its own blockchain (i.e., native to the blockchain). It should also be noted that the term crypto token, as used herein, may represent any asset that is built on an existing blockchain (e.g., CryptoKitties is built on the Ethereum blockchain; there is no blockchain solely dedicated to CryptoKitties).

Examples of market exchanges (or operators of market exchanges) include, but are not limited to, the New York Stock Exchange, Coinbase, Binance, Kraken, Euronext, and the Tokyo Stock Exchange. Such market exchanges may allow parties (e.g., users of the computing devices 102) to exchange assets with each other (e.g., communicate with the market exchange via a web browser or an app associated with the market exchange). For example, the market exchange may allow a first party to indicate their terms (or conditions) for exchanging an asset on an exchange platform (e.g., offer price or the price of an asset that they are selling). A second party may view such terms as acceptable, and may proceed to perform a transaction according to such terms. In some cases, the first party may offer the asset passively in which the second party can accept the terms (or conditions) and perform the transaction without requiring the first party to authorize such transaction (e.g., first party is offering stock for sale at a particular price, and is not interested who buys the stock). In some embodiments, a market exchange may also allow one party to transmit payments to another party in a one-way transaction (e.g., a user pays a dentist for the dental services rendered to the user).

The aforementioned regulator may regulate such market exchanges by formalizing their status as official market exchanges. In other words, the regulator may authorize (or permit) an entity to operate as market exchanges as defined in laws and/or regulations. Without the authorization of regulators, market exchanges may not be able to operate. For example, an entity (e.g., organizers of a market exchange) may apply for permission (e.g., a license) to operate as a market exchange. After going through the application process, the regulator may authorize the entity to operate as a market exchange. As such, the regulator may generate a compliance certificate that is to be transmitted to the entity. It should be noted that the regulator may regulate entities other than market exchanges, such as banks (retail and investment), entities providing payment services, organizations offering one or more types of financial services, financial technology (FinTech) organizations, etc.

A compliance certificate may authorize an entity (e.g., market exchange, banks, financial services company) to perform actions or functions permitted by the regulator. Further compliance certificates also provide proof or evidence to individuals, organizations, or governments that the entity is authorized to operate according to the regulator. Compliance certificates may include, but is not limited to, at least one of the following information: the entity being issued certificate, a domain associated with the entity, a subdomain associated with the entity, a private-public key pair assigned (and unique) to entity, the issuing authority, the issuing authority's digital signature, restriction rule(s), expiration date, date of issue, authentication information. In some embodiments, the compliance certificate includes information unique to the entity being issued the compliance certificate, such as, but not limited to, the domain associated with the entity, a subdomain associated with the entity, the private-public key pair, expiration date, date of issue, and/or authentication information.

At block 304, the certificate generating module 106a may receive instructions to generate a certificate. For example, the issuing authority or regulator may issue such instructions to the certificate generating module 106a. At block 306, the certificate generating module 106a generates a blank certificate. For example, the certificate generating module 106a may generate such blank certificate based on a pre-existing template. As such, the certificate generating module 106a may modify the blank certificate to generate a compliance certificate that includes information that is unique to the entity and information that is common among entities being managed by the regulator.

At block 308, the certificate generating module 106a may generate and/or add one or more restriction rules to the blank certificate. The restriction rules may be implemented by the issuing authority or regulator to prohibit (or allow) the entity (e.g., banks, market exchanges, financial services company) from performing certain actions. For example, such rules may specify the types of transactions that entities are prohibited or forbidden from performing. In some embodiments, the rules may be applied to every entity regulated by the issuing authority or regulator. In other embodiments, the rules may be applied to a portion of the entities being regulated by the issuing authority or regulator. In further embodiments, the restriction rules may correspond to laws or regulations, non-legal (but enforceable) regulations, or other rules that are issued by the issuing authority or regulator.

A first restriction rule may prohibit the entity from facilitating transactions that include a specific asset (e.g., cryptocurrency, crypto token, financial instruments (e.g., securities, commodities, foreign exchange, futures, options contracts), and/or fiat currency). In some embodiments, the first restriction rule may include a list of specific assets, in which transactions involving such specific assets are forbidden. For example, a cryptocurrency (or crypto token or other asset) may be considered a security under the Howey test (See Securities and Exchange Commission v. W. J. Howey Co., 328 U.S. 293 (1946)). However, such cryptocurrency has not been registered with the SEC. Therefore, transactions involving such cryptocurrency may be deemed illegal, and therefore the issuing authority or regulator may issue a restriction rule that prohibits transaction of such cryptocurrency (or crypto token or other asset).

A second restriction rule may prohibit performing transactions with parties located in certain geographical areas (e.g., countries or nation-states). In some embodiments, the second restriction rule may include a list of geographical areas, in which transactions with individuals located in such geographical areas are forbidden. For example, a country or nation-state (e.g., Russia, Iran, Venezuela, North Korea, Syria, Afghanistan) may be under sanctions, which prohibit performing transactions with one or more individuals, organizations, or governments of such country or nation-state. To determine whether a party in a transaction belongs to a restricted geographical area, the internet protocol (IP) address of a computing device (e.g., computing device 102) may be retrieved or identified to determine where the party is located. It should be noted that in some embodiments, an individual may be capable of performing transactions while in a non-restricted geographical area or country (e.g., Switzerland, Monaco, Luxembourg, Austria), but if such individual moves to a restricted country, the individual may be prohibited from performing any transactions (while still residing in such restricted geographical area). It should also be noted that fiat currencies (e.g., ruble, yuan, bolivar, rial) of countries being sanctioned may also be forbidden in transactions, even if both parties in the transaction are from non-sanctioned countries (e.g., United States, United Kingdom, Canada, France, Japan, Singapore). As such, the first restriction rule may include restrictions on fiat currencies as well.

A third restriction rule may prohibit performing transactions with certain parties (e.g., individuals, organizations, governments). In one example, an individual may not be permitted to perform transactions (e.g., sanctions on individuals) or may have limited rights (e.g., prohibition in performing transactions) due to previously violating the law. It should be noted that sanctions on individuals may not necessarily extend to the entire government or nation (e.g., a small group of military officials in China being sanctioned, but the government as a whole not being sanctioned). In another example, it may be known that the individual or organization is operating an illegal business or conducting illegal activities. Therefore, transactions with the individual or organization are forbidden or prohibited. In yet another example, it may be prohibited to perform transactions with individuals, organizations, or governments of countries under sanctions. In some embodiments, the name of the party (with which transactions are forbidden) or account information (e.g., account number, debit card information, credit card information) may be specified in the third restriction rule. In another embodiment, a wallet address may be specified in the third restriction rule. A wallet address may be an identifier associated with a digital wallet that may, for example, hold one or more types of cryptocurrencies or crypto tokens. Further, such digital wallets may allow users to perform transactions on an associated blockchain.

It should be noted that the one or more restriction rules are not limited to the aforementioned first, second, and third restriction rule. The issuing authority or regulator may decide to add an indefinite number of restriction rules to the compliance certificate depending on what the issuing authority or regulator believes is to prevent fraud from occurring. For example, the issuing authority or regulator may determine that transactions may be permissible within a specific timeframe (e.g., the entity is prohibited from executing transactions before 6:00 AM and after 7:30 PM). In another example, the issuing authority or regulator may determine that transactions with specific attributes may be prohibited within a specific timeframe (e.g., the entity is prohibited from executing transactions involving Bitcoin from 2:00 PM to 5:00 PM.). In some embodiments, each restriction rule may be associated with a timestamp, which, for example, may indicate when (e.g., the time) the restriction rule was added to the certificate. For example, the timestamp may include one or more of year, month, day, hour, minute, and second.

Figure 4:
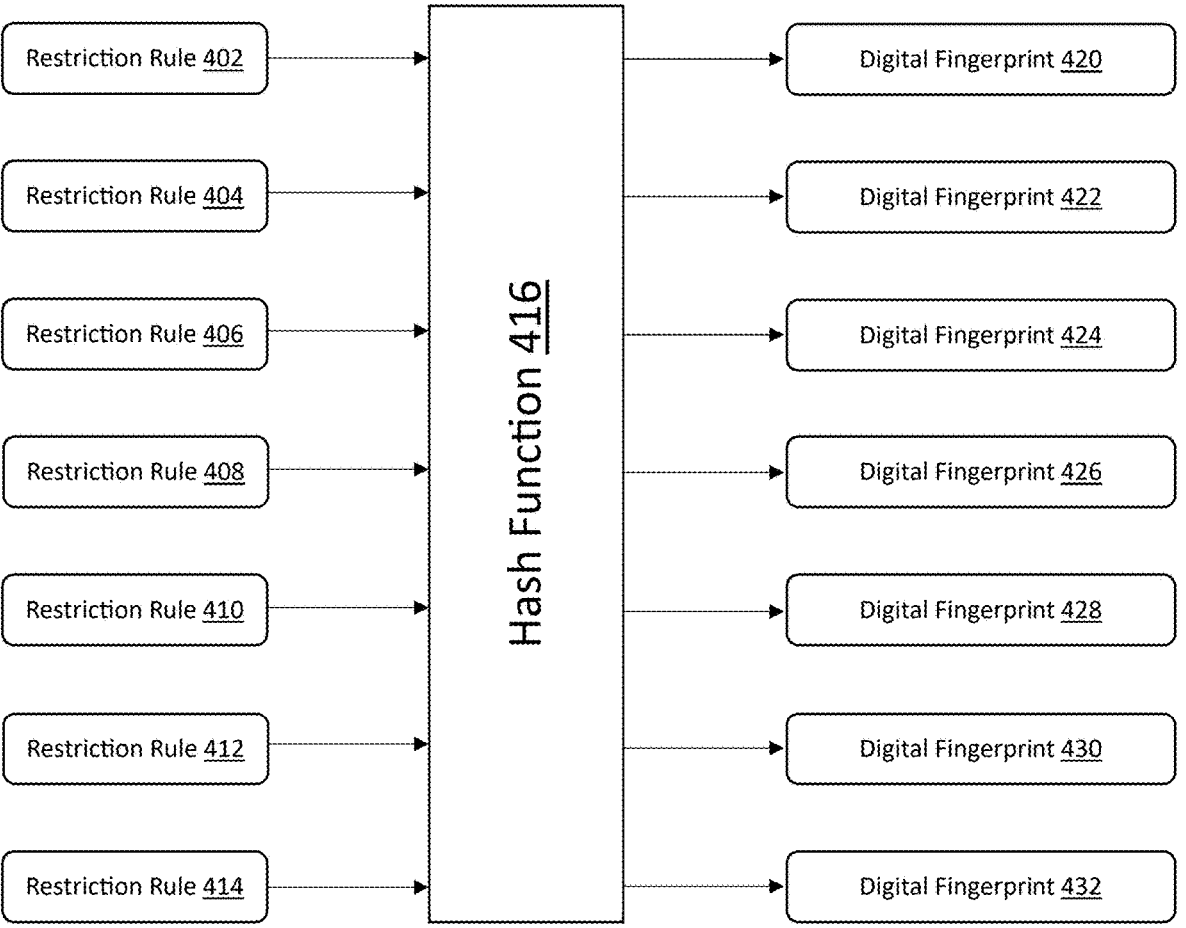
FIG. 4 is an example of diagram illustrating the feature of generating digital fingerprints using a hashing function (e.g., hashing algorithm) upon corresponding restriction rules.

At block 310, the certificate generating module 106a generates a digital fingerprint for each restriction rule. In some embodiments, the digital fingerprint is a hash of each restriction rule. In other embodiments, the digital fingerprint is a hash of the restriction rule and the associated timestamp. An illustration of such hashing is shown in FIG. 4, in which the restriction rules 402-414 are used as inputs into hash function 416 to generate digital fingerprints 420-432. For example, the restriction rule 402 (and/or associated timestamp) is used by the hash function 416 to generate the digital fingerprint 420, the restriction rule 404 (and/or associated timestamp) is used by the hash function 416 to generate the digital fingerprint 422, the restriction rule 406 (and/or associated timestamp) is used by the hash function 416 to generate the digital fingerprint 424, and so forth.

Further, the hashing algorithm used (e.g., by the hash function 416) for generating the digital fingerprint may include, but is not limited to, a hashing algorithm from one of the following hashing algorithm families: MD5, SHA-0, SHA-1, SHA-2, and Keccak including SHA-3. In some embodiments, each digital fingerprint (e.g., 420-432) may be generated using a different hashing algorithm (e.g., the hashing algorithm on restriction rule 402 (and/or associated timestamp) uses SHA-1, while the hashing algorithm on restriction rule 414 (and/or associated timestamp) is SHA-3). The digital fingerprint may be used to authenticate the corresponding restriction rule (as explained in detail infra). In other words, for example, in case of a man-in-the-middle attack on the compliance certificate (as it is being transmitted to the entity), the digital fingerprint can be used to determine that the compliance certificate has been compromised. At block 312, the certificate generating module 106a adds the generated digital fingerprints to the compliance certificate.

At block 314, the certificate generating module 106a adds attributes of the entity to the compliance certificate. For example, attributes may include the legal name of the entity being issued the certificate (e.g., an organization registered under state law), a domain associated with the entity (e.g., a website that is accessible by a browser or an app that is accessible by a computing device), and a subdomain associated with the entity (e.g., a portion of a website). In some embodiments, the attributes may also include contact information of the entity (e.g., phone number, email address, and/or physical address). In other embodiments, it may also include names of one or more persons associated with the entity (e.g., a board member, a member of the c-suite (e.g., CEO, CFO), a director, or commissioner). As such, the attributes assist the public in verifying that the compliance certificate is issued for an entity (and not some other entity) and also for providing more information about the entity to which the compliance certificate was generated.

At block 316, the certificate generating module 106a generates a private-public key pair for the entity. A private-public key pair may be, for example, generated by the certificate generating module 106a using the RSA (Rivest-Shamir-Adleman) algorithm, Diffie-Hellman algorithm, or the ElGamal encryption system. In such case, any message encrypted (or signed to create a digital signature) by the private key can be decrypted (or verified) using the corresponding public key. Likewise, any message encrypted (or signed to create a digital signature) using the public key can be decrypted (or verified) using the corresponding private key. Further, the public key may made publicly available such that other users or parties may have access to the public key, while the private key is made accessible only to the entity (or owner). In some embodiments, the private-public key pair may be unique to the entity. As such, when the certificate generating module 106a generates a private-public key for another entity, such private-public key pair is different. In some embodiments, the intention of providing the entity with a private-public key is to allow the entity a mechanism to provide a form of verification for transactions executed by the entity. In other words, other users (e.g., the public) may determine which transactions are executed by which entity based on digital signature on the transaction generated using the private key (which other users can verify using the public key in the certificate). At block 318, the certificate generating module 106a adds the private-public key pair to the compliance certificate.

At block 320, the certificate generating module 106a generates a compliance signature, which includes one or more compliance signed rules. The compliance signed rules may be generated by performing a hash of the restriction rule and signing the hashed restriction rule using a private key of the issuing authority or regulator. Like previously, the private-public key pair of the regulator may be, for example, generated by the certificate generating module 106a using the RSA (Rivest-Shamir-Adleman) algorithm, Diffie-Hellman algorithm, or the ElGamal encryption system. In such case, any message encrypted (or signed to create a digital signature) by the private key can be decrypted (or verified) using the corresponding public key. Likewise, any message encrypted (or signed to create a digital signature) using the public key can be decrypted (or verified) using the corresponding private key. In some embodiments the regulator may generate their own private-public key pair. In other embodiments, the issuing authority or regulator may obtain such private-public key pair from a third-party service (e.g., organization that provides private-public key pairs for a cost).

Figure 5:
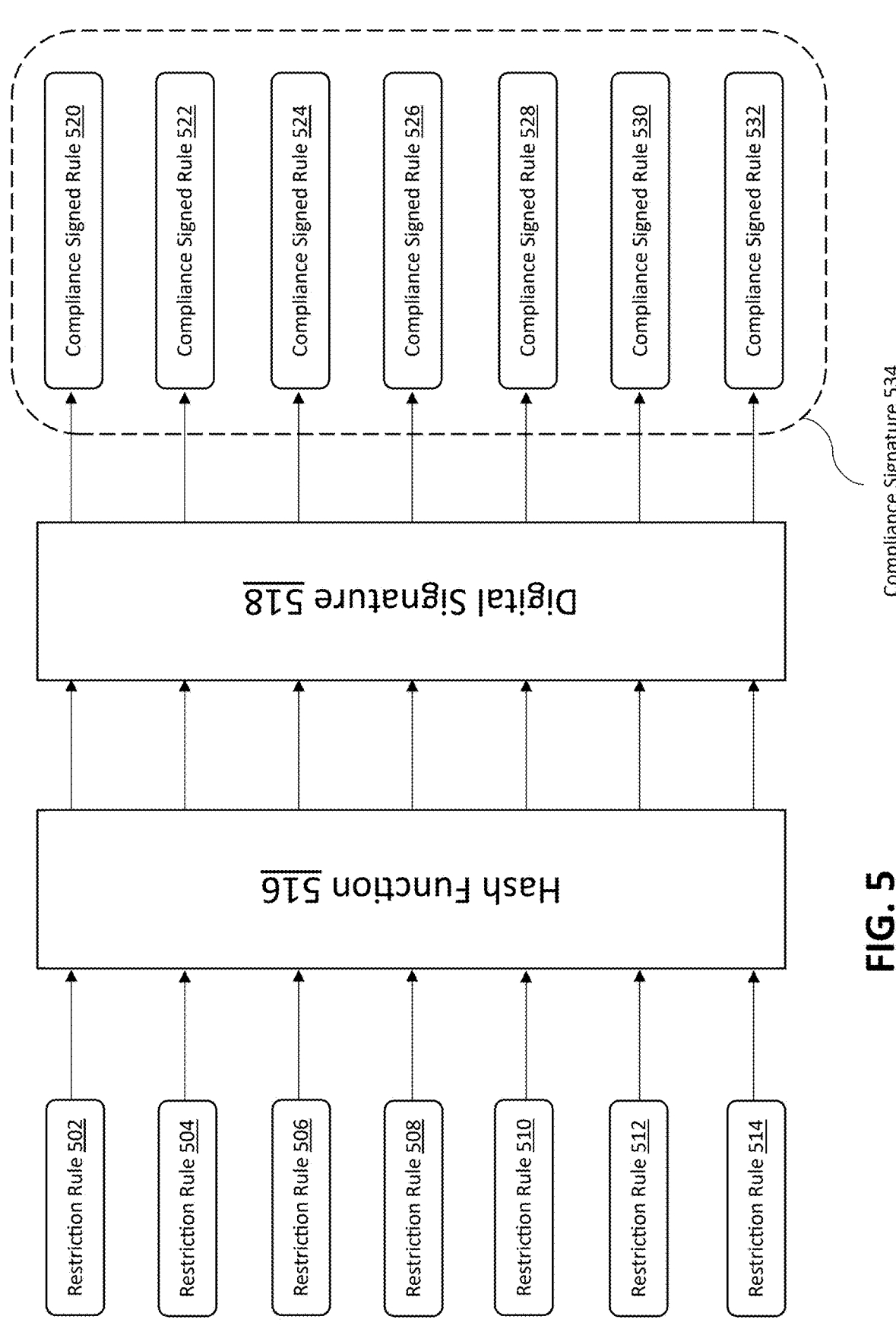
FIG. 5 is an example of diagram illustrating the feature of generating a compliance signature, which includes compliance signed rules that are generated using a hashing function (e.g., hashing algorithm) and signing corresponding restriction rules.

An illustrative example of such a process is shown in FIG. 5. In this case, the restriction rules 502-514 are used by the hash function 516 to generate hashed restriction rules. The hashing algorithm used (e.g., by the hash function 516) for generating the hashed restriction rules may include, but is not limited to, a hashing algorithm from one of the following hashing algorithm families: MD5, SHA-0, SHA-1, SHA-2, and Keccak including SHA-3. In some embodiments, the hashing algorithm used to generate the hashed restriction rules is the same as the hashing algorithm used (e.g., by the hash function 416) to generate the digital fingerprints. As such, the certificate generating module 106a may simply sign the digital fingerprints using the private key of the issuing authority or regulator to generate compliance signed rules 520-532. In another embodiment, the hash function 516 may use a hashing algorithm that is different than the one used by the hash function 416. As such, the restriction rules 502-514 are hashed by the hashed function 516 to generate one or more hashed restriction rules. In turn, the one or more hashed restriction rules are each signed using the private key of the issuing authority or regulator (e.g., to generate a digital signature) to generate the compliance signed rules 520-532. As such (in either case, whether the digital fingerprint is signed or the hashed restriction rule is signed), the restriction rule 502 is associated with the compliance signed rule 520, the restriction rule 504 is associated with the compliance signed rule 522, the restriction rule 506 is associated with the compliance signed rule 524, and so forth. The compliance signed rules 520-532 are collectively grouped together as a compliance signature 534.

At block 322, the compliance signature (e.g., compliance signature 534) is added by the certificate generating module 106*a* to the compliance certificate.

At block 324, the certificate generating module 106*a* (digitally) signs the compliance certificate. For example, the certificate generating module 106*a* may use the private key of the issuing authority or regulator to sign the compliance certificate. As such, the certificate generating module 106*a* generates a digital signature on the compliance certificate. Next, the at block 326, certificate generating module 106*a* transmits the compliance certificate to the entity (e.g., electronically, via email, via file transfer protocol, or via a specialized software for communicating with the one or more entities regulated by the issuing authority or regulator). In some embodiments, the compliance certificate generated by an entity is not permanent. In other words, there may be cases in which a new (or updated) compliance certificate is warranted.

For example, a new (or updated) compliance certificate may be generated every time that a new restriction rule is established by the regulator (e.g., a new country becomes sanctioned). In such case, the changes in the new compliance certificate may include new restriction rules and a new public-private key pair for the entity. As such, in some embodiments, it is possible for a first transaction to be compliant according to the one or more restriction rules of the old compliance certificate and be violating (or fraudulent) according to the one or more restriction rules in the updated compliance certificate. Likewise, in some embodiments, it is possible for a second transaction to be violating (or fraudulent) according to the one or more restriction rules of the old compliance certificate and be compliant according to the one or more restriction rules in the updated compliance certificate.

In another example, there may be changes in the legal name of the entity or domains (or subdomains) associated with the entity. As such, the entity may request the regulator to issue a new certificate to accommodate such changes. It should be noted that generating a new compliance certificate can reduce the possibility of fraud as well. For example, it reduces the amount of time that a malicious employee uses the private key in the compliance certificate to commit fraud (since a new certificate with a new private key renders the old private key useless).

In some embodiments, as shown in FIG. 6, the compliance certificates 602, 604, and 606 for each of the respective (or corresponding) entities 608, 610, and 612 includes one or more of the same information such as issuing authority, the issuing authority's digital signature, the restriction rule(s), the expiration date, the date of issue, and the authentication information (e.g., digital fingerprint, compliance signature) and different information such as the entity being issued certificate, the domain associated with entity, the subdomain associated with entity, the private-public key pair, and the expiration date, the date of issue. It should be noted that the expiration date and the date of issue may be different in cases in which the entities 608, 610, 612 were authorized by the regulator at different times. In some embodiments, the compliance certificate is generated (near) simultaneously for (all) entities that are regulated by the regulator. As such, whenever a new restriction rule is established, a new compliance certificate is issued for each of the entities. In such case, the expiration date and the date of issue may be the same for each of the new certificates. By facilitating such process, each entity is capable of keeping up to date with the current restriction rules that are established by the regulator. Further, the concept of (near) simultaneously generating and transmitting the compliance certificate 602 to each entity also ensures that the restriction rules are applied at once, such that malicious actors attempting to perform fraud may not have the opportunity to do so due to the entities all being updated at once with the same restriction rules. At block 328, the routine ends.

It should be noted that the generating (and/or adding) of the restriction rules, the digital fingerprints, the attributes, the public-private key, and/or the compliance signature may be performed in any order, and is not limited to the arrangement of blocks illustrated in the routine 300 of FIG. 3. Likewise, any of the blocks 302-328 can be performed in any unspecified order, and is not limited to the arrangement illustrated in the routine 300 of FIG. 3.

Example Routine for Authenticating Certificate

When a routine described herein (i.e., 300, 700, 800, 1000, and 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300A shown in FIG. 13A or the computing device 1300B shown in FIG. 13B, and executed by one or more processors. In some embodiments, the routine 300, 700, 800, 1000, and 1100, or portions thereof may be implemented on multiple processors, serially or in parallel.

Figure 7:
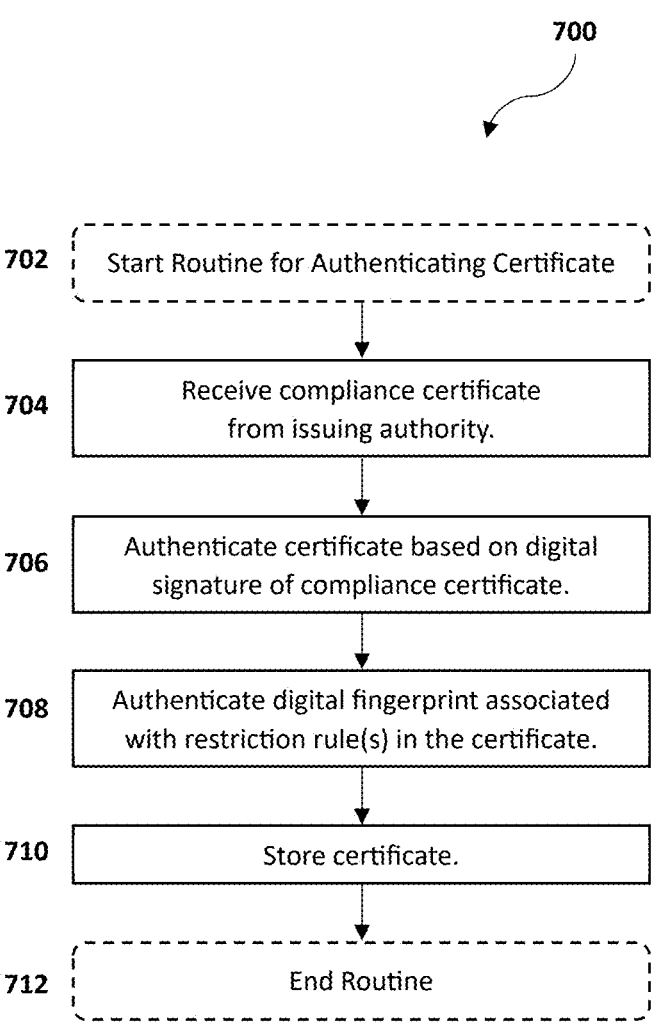
FIG. 7 is a flow diagram of a computerized method for authenticating a certificate.

FIG. 7 illustrates example routine 700 (beginning at block 702) for authenticating a compliance certificate, that is performed, for example, by the certificate management module 108*a*. At block 704, the certificate management module 108*a* receives the compliance certificate from the issuing authority or regulator. For example, the server computing device 108*a* may receive the compliance certificate from the server computing device 106 of the issuing authority or regulator and forward such compliance certificate to the certificate management module 108*a*.

At block 706, the certificate management module 108*a* authenticate certificate based on digital signature of compliance certificate. For example, the compliance certificate may be signed using the private key of the issuing authority or regulator. As such, the certificate management module 108*a* may authenticate the digital signature of the issuing authority or regulator by using the corresponding public key. In other words, the certificate management module 108*a* can use the public key to performing decrypting to obtain the compliance certificate. If the decrypting results in a random incoherent message, then it may mean that the compliance certificate did not originate from the issuing authority or the regulator (and therefore should be discarded).

At block 708, the certificate management module 108*a* authenticates the digital fingerprints associated with the one or more restriction rules in the certificate. To facilitate such process, the certificate management module 108*a* may generate a hash each restriction rule, and determine whether such hash is equivalent to the corresponding digital fingerprint. In the case that they are equal, the restriction rule is determined to be authentic or valid. Otherwise, in the case that they are not equal, the restriction rule is determine to invalid or not authentic. For example, with respect to FIG. 4, the certificate management module 108*a* may generate a hash of the restriction rule 402 (using the same hashing algorithm that resulted in digital fingerprint 420). If the hash of the restriction rule 402 (generated by the certificate management module 108*a*) matches the digital fingerprint 420, then the restriction rule 402 is determined to be valid or authentic. The certificate management module 108*a* may perform such authentication or verification for each of the restriction rules 402-414 in view of the digital fingerprints 420-432. In some embodiments, the compliance certificate also includes information on the specific hashing algorithm that was used to generate each of the digital fingerprints. As such, the certificate management module 108*a* may be able to generate and compare hashes of the restriction rule with the digital fingerprint.

At block 710, the certificate management module 108*a* stores the compliance certificate. For example, the certificate management module 108*a* may store the compliance certificate in a location on the server computing device 108. In some embodiments, the compliance certificate may verify the digital signature of the issuing authority or the regulator and verify each one of the restriction rules in the compliance certificate before storing the compliance certificate. In case of at least one instance that a verification cannot be performed (for the digital signature or at least one of the restriction rules), the certificate management module 108*a* may discard the compliance certificate. The routine ends at block 712.

Example Routine for Processing Transaction

When a routine described herein (i.e., 300, 700, 800, 1000, and 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300A shown in FIG. 13A or the computing device 1300B shown in FIG. 13B, and executed by one or more processors. In some embodiments, the routine 300, 700, 800, 1000, and 1100, or portions thereof may be implemented on multiple processors, serially or in parallel.

Figure 8:
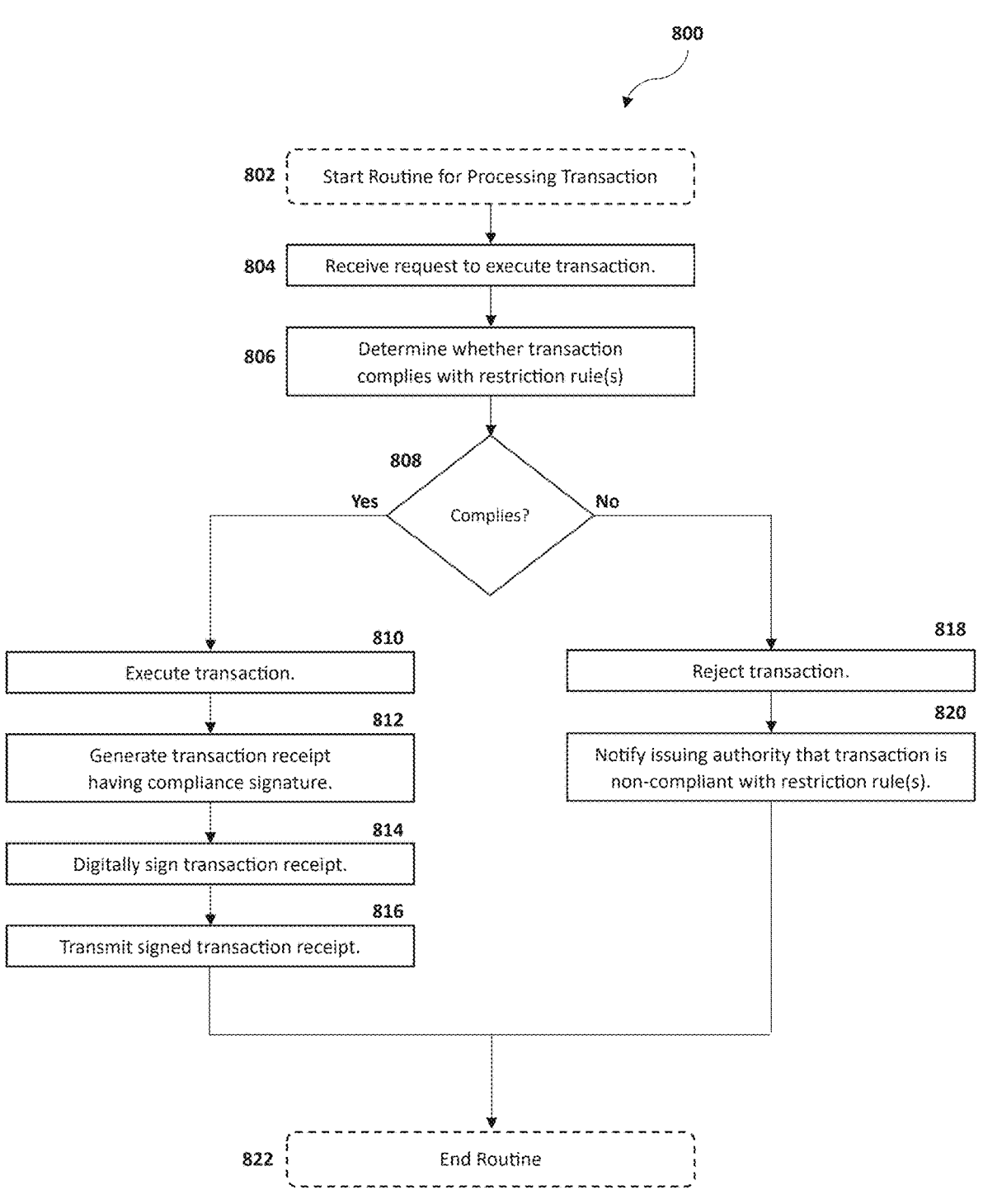
FIG. 8 is a flow diagram of a computerized method for processing a transaction.

FIG. 8 illustrates example routine 800 (beginning at block 802) for processing a transaction, that is performed, for example, by the transaction processing module 108*b*. At block 804, the transaction processing module 108*b* receives a request to execute a transaction (or one or more transactions). For example, the request may originate from a user on the computing device 102. The user of the computing device 102 may be utilize a browser or app to access the services provided by the server computing device 108. The transaction may include, but is not limited to, the following attributes: parties to the transaction and the assets (e.g., type and quantity) upon which to be transacted. The parties to the transaction may include, but are not limited to, individuals, organizations, and governments. The assets may include, but are not limited to, cryptocurrency, crypto token, financial instruments (e.g., securities, commodities, foreign exchange, futures, and options contracts) and fiat currency. In another example, the attributes may also include, but is not limited to, one or more of the following: trade type (e.g., buy or sell), order type (e.g., market, stop-loss, limit), assets, quantities associated with assets, timestamp, and accounts or wallet addresses that are associated with the parties involved in the transaction.

In some embodiments, the entity associated with the transaction processing module 108*b* assists in executing the transaction between the parties to the transaction. For example, the entity acts as a middle man for the parties. In another example, the entity may allow users or parties to provide a listing of their assets (e.g., an inventory) for sale on a platform hosted by the entity (e.g., website or app). Users or other parties may view the listing of assets, and determine whether they wish to perform an exchange (e.g., purchase) of such assets. In a further example, the listing of assets includes a description of the asset, and the price associated with the asset. In addition, the party associated with the asset may also indicate the assets that the party is accepting (e.g., fiat currency, cryptocurrency). Further, the entity may have access to the account holding such assets associated with each of the users or parties using the platform hosted by the entity. For example, each user may have one or more of an asset account, such as a bank account, investment account, financial account, or a digital wallet (e.g., holds cryptocurrency or crypto token). As such, when transactions occur, the entity may facilitate such transaction by accessing the respective asset account.

For example, a transaction may include a first user, a second user, a first asset, and a second asset, in which the transaction identifies an exchange between the first asset associated with the first user and a second asset associated with the second user. In another example, there may be one or more transactions performed at once involving different assets. In such case, the first party may be offering for sale the following assets: a cryptocurrency (e.g., Bitcoin), a commodity (e.g., gold), and a financial instrument (e.g., stocks). Each of the aforementioned assets may be associated with the same or different price. A second user may perform one or more transactions involving such assets. In some embodiments, the second user may perform a single transaction involving an exchange of one asset for another (e.g., second user buys the cryptocurrency using crypto token) or an exchange of multiple assets for another (e.g., second user buys the cryptocurrency and the commodity using fiat currency). In other embodiments the second user may perform multiple (separate) transactions (e.g., second user buys the cryptocurrency using crypto token according to a first transaction and buys the stock using cryptocurrency according to a second transaction). In a further example, the transaction may include a first user, a second user, and one or more assets. In such case, the first user may be attempting to pay the second user using the one or more assets (e.g., first user is paying second user for the goods or services rendered to the first user or first user is providing a gift to the second user). As such, payment is in one direction with no exchange of an asset from the second user to the first user.

At block 806, the transaction processing module 108*b* determines whether the transaction complies with the one or more restriction rules. As discussed previously, the one or more restriction rules are each associated with a restriction (or condition) that prohibits transactions having certain attributes. For example, a transaction involving a party located in a specific country (determined via IP address of parties in the transaction) may be prohibited (e.g., specific country is sanctioned). In another example, a transaction involving a specific asset (e.g., unregistered security) may also be prohibited. In a further example, a transaction involving a specific digital wallet may be prohibited as well (e.g., the digital wallet belongs to a criminal or sanctioned individual). In yet a further example, executing a transaction during a specific timeframe or time period (e.g., prohibit transactions from Thursday to Sunday) may also be prohibited.

As such, if the attributes of the transaction violate at least one restriction rule, the transaction processing module 108*b* determines (at block 808) that the transaction is non-compliant with the one or more restriction rules. Likewise, if the attributes of the transaction does not violate a single restriction rule of the one or more restriction rules, the transaction processing module 108*b* determines (at block 808) that the transaction is compliant with the one or more restriction rules. It should be noted that the determination occurs in real-time. Real-time may relate to a system in which input data (e.g., the transaction or request to perform transaction)

is processed (e.g., to generate output data) within milliseconds (e.g., with minimal delay) so that it (e.g., the output) is available virtually immediately or within milliseconds (e.g., determination at block 808 is output immediately). In other words, the entity may be processing millions of transactions in a day, and the transaction processing module 108*b* is capable of determining in real-time whether a transaction or a request to perform a transaction violates the one or more restriction rules.

In case that the transaction complies with the one or more restriction rules (e.g., does not violate any of the restriction rules) (block 808, yes), the routine moves to block 810. At block 810, the transaction processing module 108*b* executes the transaction. In other words, the transaction processing module 108*b* may have the capability of exchanging the assets identified in the transaction. For example, the transaction processing module 108*b* may access the asset accounts (e.g., bank account, investment account, financial account, or a digital wallet) and withdraw the amounts (from the asset accounts) as identified in the transaction to perform the exchange.

At block 812, the transaction processing module 108*b* generates a transaction receipt having a compliance signature. For example, the transaction receipt may include the attributes of the transaction and attributes of the entity, which may include trade type (e.g., buy or sell), order type (e.g., market, stop-loss, limit), assets, quantities associated with assets, timestamp (e.g., of when the transaction was executed), token master hash, asset accounts (e.g., bank account or wallet address) of parties involved in the transaction, transaction receipt hash, transaction identifier (ID), fee amount (e.g., fee to be paid to entity for executing transaction), fee currency. An example of a transaction receipt is illustrated in FIG. 9. The transaction receipt may additionally include a compliance signature, which may be obtained from the compliance certificate. As discussed above with respect to FIGS. 3 and 5, the compliance signature (e.g., compliance signature 535) includes one or more compliance signed rules (e.g., compliance signed rules 520-532) which correspond to respective restriction rules that have been hashed (according to a hashing algorithm) and signed (e.g., using the private key of the issuing authority or the regulator). For example, as shown in FIG. 9, the compliance signature includes three compliance signed rules, which are the "Signed Token Master Hash," the "Signed Country Master Hash," and the "Signed Wallet Master Hash." As such, it may not be necessary to generate the compliance signature and, instead, obtain (e.g., make a copy) of the compliance signature from the compliance certificate.

At block 814, the transaction processing module 108*b* digitally signs the transaction receipt. For example, the transaction processing module 108*b* may digitally sign the transaction receipt by using the private key provided in the compliance certificate. As illustrated in FIG. 9, the transaction signature is represented by "Transaction Signature." In some embodiments, the transaction processing module 108*b* may also generate a hash of the transaction receipt using a hashing algorithm, that includes, but is not limited to, a hashing algorithm from one of the following hashing algorithm families: MD5, SHA-0, SHA-1, SHA-2, and Keccak including SHA-3. As illustrated in FIG. 9, the transaction signature is represented by "Transaction Receipt Hash." At block 816, the transaction processing module 108*b* transmits the signed transaction receipt. For example, the transaction processing module 108*b* may transmit (e.g., email or notification on app) the signed transaction receipt to the users or parties involved in the transaction. In some embodiments, the transaction processing module 108*b* may transmit the signed transaction receipt to the issuing authority or the regulator as well (e.g., to the server computing device 106).

In case that the transaction fails to comply with the one or more restriction rules (e.g., violates at least one of the restriction rules), the routine moves to block 818. At block 818, the transaction processing module 108*b* rejects or blocks the transaction. In other words, the transaction processing module 108*b* does not execute the transaction. For example, none of the amounts (from the asset accounts associated with the users or parties to the transaction) as identified in the transaction are withdrawn or moved in any way. In some embodiments, the transaction processing module 108*b* transmits a notification (e.g., email or notification on app) to the users or parties involved in the transactions to notify them that their transaction has been rejected or blocked. In some embodiments, the rejection (or blocking) of a transaction indicates that the transaction is fraudulent.

At block 820, the transaction processing module 108*b* notifies the issuing authority or regulator that the transaction is non-compliant with the one or more restriction rules. For example, the transaction processing module 108*b* may transmit attributes of the intended or rejected (or blocked) transaction to the issuing authority. Such attributes may include trade type (e.g., buy or sell), order type (e.g., market, stop-loss, limit), assets, quantities associated with assets, timestamp, token master hash, asset accounts (e.g., bank account or wallet address) of parties involved in the transaction. As a result, the issuing authority may be notified of whether a fraudulent transaction was about to occur (and take corresponding action). For example, it may be determined that a first party was attempting to perform a transaction with a second party who is known to be a criminal or sanctioned individual. Therefore, the issuing authority, upon receiving the notification, may take appropriate action against the first party, such as, for example, associating the asset account (e.g., bank account or digital wallet address) of the first party with a new restriction rule (so that the first party can no longer perform transactions under entities regulated by the issuing authority or the regulator). In some embodiments, a fraud notification is transmitted to the issuing authority indicating that an attempt at a fraudulent transaction has been detected and successfully blocked. The routine ends at block 822.

Example Routine for Compliance Auditing

When a routine described herein (i.e., 300, 700, 800, 1000, and 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300A shown in FIG. 13A or the computing device 1300B shown in FIG. 13B, and executed by one or more processors. In some embodiments, the routine 300, 700, 800, 1000, and 1100, or portions thereof may be implemented on multiple processors, serially or in parallel.

Figure 10:
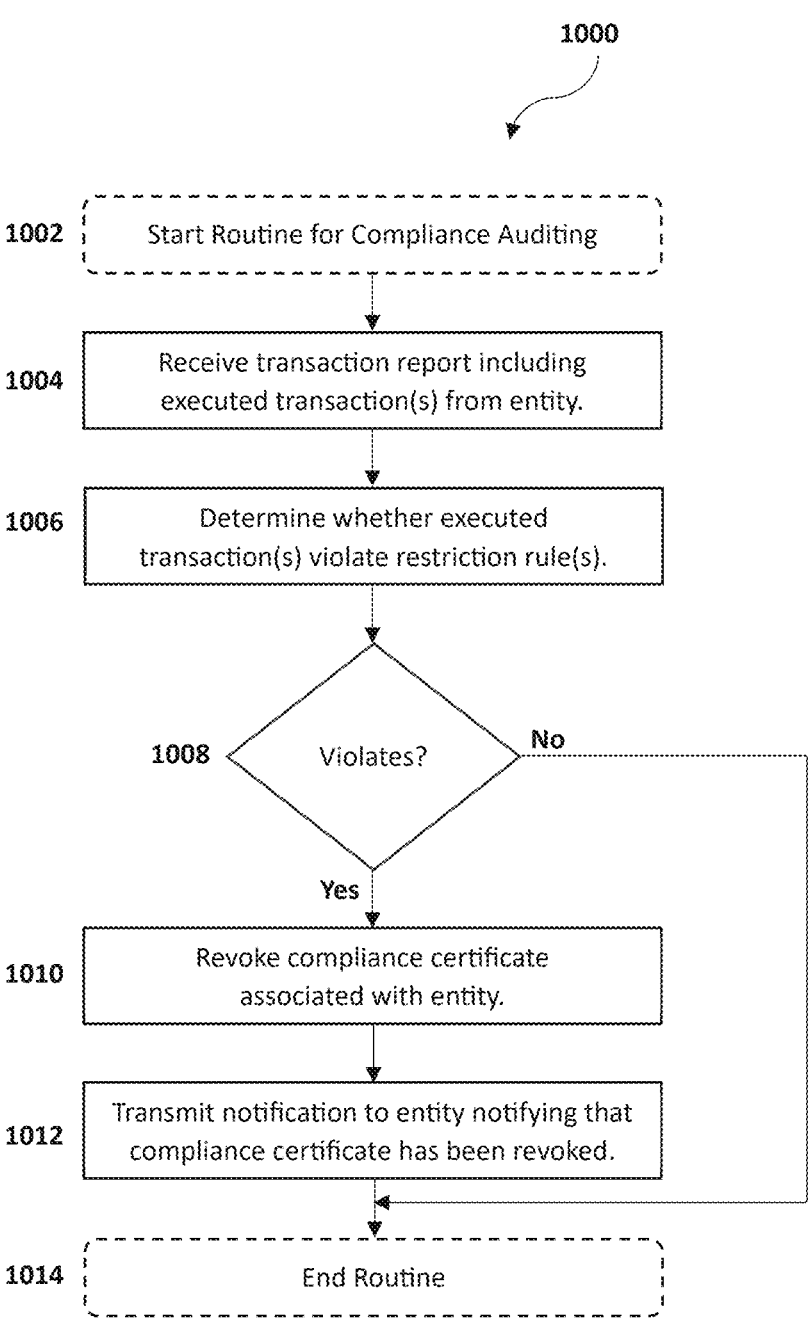
FIG. 10 is a flow diagram of a computerized method for processing one or more transactions.

FIG. 10 illustrates example routine 1000 (beginning at block 1002) for performing compliance auditing, that is performed, for example, by the entity surveillance module 106*b*. At block 1004, the entity surveillance module 106*b* receives a transaction report including one or more executed transactions from the entity (e.g., form the server computing device 108). For example, the entity surveillance module 106*b* may receive the transaction report via email or through a specialized software for communicating with the one or more entities regulated by the issuing authority or regulator.

In other words, the transaction report may include a list of the transaction executed by the transaction processing module 108a. In some embodiments, the transaction report may also include transaction that have been blocked or rejected by the transaction processing module 108b for violating at least one of the one or more restriction rules in the compliance certificate. For example, the transaction report may include a list of one or more transaction receipts within a timeframe or specific time period (e.g., all transactions within a day, month, three-months, six-months, year). In some embodiments, the transaction receipts included within the transaction report may be similar to the transaction receipt shown in FIG. 9. In further embodiments, the server computing device 106 automatically transmits the transaction report at a set interval. For example, the issuing authority or regulator may require that the entity implement a system or software in the server computing device 108 that allows automatic generating and transmission of transaction reports.

At block 1006, the entity surveillance module 106b determines whether the one or more executed transactions included in the transaction report violate the currently established one or more restriction rules. For example, the entity surveillance module 106b may store a copy of the one or more restriction rules (that is currently in force). As such, the entity surveillance module 106b may iterate over the one or more executed transactions in the transaction report to determine whether at least one of the one or more executed transactions violates the one or more restriction rules. Examples of violations include, but is not limited to, a transaction involving a party located in a sanctioned country (determined via IP address of parties in the transaction), a transaction involving a specific asset (e.g., unregistered security), a transaction involving a specific digital wallet, and/or a transaction occurring at a specific prohibited timeframe.

In the case that at least one of the executed transactions in the transaction report violates at least one of the one or more restriction rules (block 1008, yes), the routine moves to block 1010. At block 1010, the entity surveillance module 106b revokes the compliance certificate associated with entity. In other words, the entity may no longer be authorized to operate. For example, in case that the entity was operating as a market exchange, the entity is now forbidden from performing functions as a market exchange. Further, the entity surveillance module 106b may also store a record identifying the entity as violating the one or more restriction rules (e.g., entity is possibly engaged in fraud) and that the compliance certificate associated with the entity has been revoked.

In some embodiments, even if the transaction report includes executed transactions that violate the one or more restriction rules, it may not necessarily lead to the revocation of the compliance certificate. In other words, there may be a predetermined threshold that is set by the entity surveillance module 106b. For example, in the case that the number of transactions (each of which violates at least one of the one or more restriction rules) fail to reach the predetermined threshold, the entity surveillance module 106b may not revoke the compliance certificate associated with entity. On the other hand, in the case that the number of transactions (each of which violates at least one of the one or more restriction rules) does reach the predetermined threshold, the entity surveillance module 106b may revoke the compliance certificate associated with entity. Such embodiment prevents scenarios in which an unintentional error in the server computer device 108 causes the compliance certificate to be revoked.

At block 1012, entity surveillance module 106b transmits a notification to the entity notifying that compliance certificate has been revoked. For example, the transmission may be performed by email or specialized software used by the issuing authority or regulator for communicating with the one or more entities regulated by the issuing authority or regulator. In some embodiments, the compliance certificate may be tied to the platform hosted by the entity, such that the platform is automatically rendered inoperative when the server computing device 108 receives the notification that the compliance certificate has been revoked. In the case that at least one of the executed transactions in the transaction report complies with each of the one or more restriction rules (block 1008, no), the routine moves to block 1014. In other words, the entity has complied with the regulations set forth by the issuing authority or the regulator, and therefore may maintain its compliance certificate. The routine ends at block 1014.

Example Routine for Validating Transaction

When a routine described herein (i.e., 300, 700, 800, 1000, and 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300A shown in FIG. 13A or the computing device 1300B shown in FIG. 13B, and executed by one or more processors. In some embodiments, the routine 300, 700, 800, 1000, and 1100, or portions thereof may be implemented on multiple processors, serially or in parallel.

Figure 11:
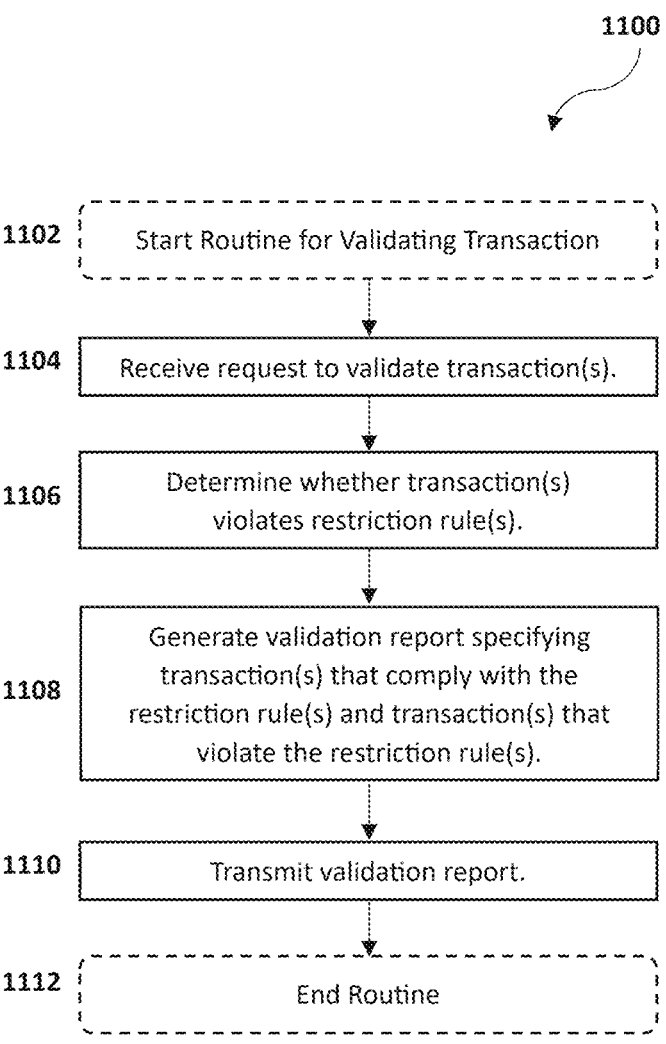
FIG. 11 is a flow diagram of a computerized method for validating one or more transactions.

FIG. 11 illustrates example routine 1100 (beginning at block 1102) for validating transaction, that is performed, for example, by the transaction validating module 106c. At block 1104, the transaction validating module 106c receives a request to validate one or more transactions. For example, a user of the computing device 102 may have had one or more transactions executed by the entity (e.g., the server computing device 108 or the transaction processing module 108b). However, the user of the computing device 102 may wish to have the transactions revalidated to ensure that the executed transactions are still valid. In another example, a third-party (with some interest in at least one of the executed transactions, e.g., a court of law or the issuing authority or regulator themselves) may also request that the execution be validated. For example, there may be millions of transactions in a day, in which the determination of whether a transaction violates at least one of the one or more restriction rules and/or the execution of such transaction (in the case it is determined that the transaction does not violate at least one of the one or more restriction rules) is performed in real-time (e.g., less than a second or less than a millisecond).

As such, as discussed above, when an updated compliance certificate is issued by the issuing authority, it may take time (e.g., greater than a second or a minute) to receive the updated compliance certificate. It may be that from the perspective of the issuing authority or the regulator, the moment the updated compliance certificate leaves the server computing device 106 is the moment that the one or more updated restriction rules in the updated compliance certificate are in force. However, it may be that, from the perspective of the entity, the entity can only enforce the one or more updated restriction rules once the entity receives the compliance certificate. Therefore, there may be a time difference (from when the updated compliance certificate is transmitted to the entity to when the entity actually receives the updated compliance certificate) that causes the transaction processing module 108b to execute transactions that violate at least one of the one or more updated restriction rules. As such, a user of the computing device 102 may be aware of such problem, and may attempt to revalidate his or her executed transactions to confirm that such executed transaction are still valid.

At block 1106, the transaction validating module 106c determines whether the executed transactions violate at least one of the one or more restriction rules. For example, the transaction validating module 106c may iterate over each of the one or more executed transactions, to determine (for each executed transaction) whether an executed transaction has violated at least one of the one or more restriction rules. Examples of violations include, but is not limited to, a transaction involving a party located in a sanctioned country (determined via IP address of parties in the transaction), a transaction involving a specific asset (e.g., unregistered security), a transaction involving a specific digital wallet, and/or a transaction occurring at a specific prohibited time-frame.

At block 1108, the transaction validating module 106c generates a validation report specifying the one or more executed transactions that comply with the one or more restriction rules and the one or more executed transactions that violate the one or more restriction rules. An example of such validation report is illustrated in FIG. 12, in which the validation report includes for each of the one or more executed transactions, the transaction identifier (ID), the attributes (or details) associated with the transaction (e.g., parties involved in the transaction, trade type (e.g., buy or sell), order type (e.g., market, stop-loss, limit), assets, quantities associated with assets, timestamp, and accounts or wallet addresses that are associated with the parties involved in the transaction), and a determination of whether the executed transaction is compliant with the one or more restriction rules (e.g., yes or no).

At block 1110, the transaction validating module 106c transmits the validation report. In some embodiments, the transaction validating module 106c transmits the validation report to the client computing device 102 or any computing device associated with the user who requested to validate the executed transactions, such as the third-party as discussed previously (e.g., via email or an app). In other embodiments, the transaction validating module 106c may also notify personnel associated with the issuing authority or regulator of the validation report. For example, it may be that the validation report demonstrates that the entity may have executed one or more fraudulent transactions. In another example, the validation report may demonstrate that the entity is allowing transactions that are known have violated one or more restriction rules whose lifespan is beyond a predetermined threshold (e.g., North Korea has been sanctioned for many decades). Therefore, it is unlikely that the time difference (as indicated above) played a role in allowing the execution of this transaction. In other words, it should have been forbidden anyway. Therefore, the executed transaction may be fraudulent. At block 1112, the routine ends.

Execution Environment

FIG. 13A illustrates various components of an example computing device 1300A configured to implement various functionality described herein.

In some embodiments, the computing device 1300B may be implemented using any of a variety of computing devices, such as server computing devices, desktop computing devices, personal computing devices, mobile computing devices, mainframe computing devices, midrange computing devices, host computing devise, or some combination thereof. In some embodiments, the features and services provide by the computing device 1300A may be implemented as webs services consumable via one or more communication networks. In further embodiments, the computing device 1300A is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 1300A may include one or more processors 1302A, such as physical central processing units ("CPUs"); one or more network interfaces 1304A, such as network interface cards ("NICs"); one or more computer readable medium drives 1306A, such as a high density disk ("HDDs"), solid state drives ("SSDs"), flash drives, and/or other persistent computer readable media; one or more input/output drive interfaces 1308A; and one or more computer-readable memories 1310A, such as random access memory ("RAM") and/or other volatile non-transitory readable media.

The one or more computer-readable memories 1310A may include computer program instructions that one or more computer processors 1302A execute and/or data that the one or more computer processors 1302A use in order to implement one or more embodiment. For example, the one or more computer-readable memories 1310A can store an operating system 1312A to provide general administration of the computing device 1300A. As another example, the one or more computer-readable memories 1310A can store certificate generating module 1314A (e.g., certificate generating module 106a) for generating compliance certificates. In a further example, the one or more computer-readable memories 1310A can store an entity surveillance module 1316A (e.g., entity surveillance module 106b) for performing compliance auditing, so as to determine whether to revoke compliance certificates issued to entities. In yet another example, the one or more computer-readable memories 1310A can store a transaction validating module 1318A (e.g., transaction validating module 106c), which validates one or more executed transactions upon request from a party involved in the executed transaction.

FIG. 13B illustrates various components of an example computing device 1300B configured to implement various functionality described herein.

In some embodiments, the computing device 1300B may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 1300B may be implemented as webs services consumable via one or more communication networks. In further embodiments, the computing device 1300B is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 1300B may include one or more processors 1302B, such as physical central processing units ("CPUs"); one or more network interfaces 1304B, such as network interface cards ("NICs"); one or more computer readable medium drives 1306B, such as a high density disk ("HDDs"), solid state drives ("SSDs"), flash drives, and/or other persistent computer readable media; one or more input/output drive interfaces 1308B; and one or more computer-readable memories 1310B, such as random access memory ("RAM") and/or other volatile non-transitory readable media.

The one or more computer-readable memories 1310B may include computer program instructions that one or more computer processors 1302B execute and/or data that the one or more computer processors 1302B use in order to implement one or more embodiment. For example, the one or more computer-readable memories 1310B can store an operating system 1312B to provide general administration of the computing device 1300B. As another example, the one or more computer-readable memories 1310B can store a certificate management module 1314B (e.g., certificate management module 108a) to manage compliance certificates (e.g., authenticating and storing compliance certificates). In a further example, the one or more computer-readable memories 1310B can store a transaction processing module 1316B (e.g., transaction processing module 108b) for performing compliance auditing, so as to determine whether to revoke compliance certificates issued to entities.

Terminology

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computing (or computer) system for authenticating compliance certificates, the system comprising a server computing device having a memory for storing computer-executable instructions and a processor that executes the computer-executable instructions to:

receive a compliance certificate from an issuing authority, the compliance certificate comprising one or more restriction rules associated with digital currency transactions using blockchains and one or more digital fingerprints, wherein each of the one or more restriction rules comprises one or more prohibited attributes, wherein each of the one or more digital fingerprints comprises a first hash of a corresponding restriction rule of the one or more restriction rules calculated using a first hash function, the compliance certificate being encrypted using an encryption key for the issuing authority;

authenticate the compliance certificate based on decryption of the compliance certificate using a decryption key corresponding to the encryption key for the issuing authority;

calculating a second hash of each of the one or more restriction rules using a second hash function;

comparing the second hash of each of the one or more restriction rules with the first hash comprised in the digital fingerprint of the corresponding restriction rule;

in response to determining that the second hash of at least one of the one or more restriction rules fails to match the first hash comprised in the digital fingerprint of the corresponding restriction rule, reject the compliance certificate;

in response to determining that each second hash of the one or more restriction rules matches each of the first hash comprised in the digital fingerprint of the corresponding restriction rule, process one or more digital currency transactions based on the compliance certificate, comprising:

receive requests to execute the one or more digital currency transactions, wherein each of the one or more digital currency transactions includes one or more attributes;

execute a first digital currency transaction of the one or more digital currency transactions in response to determining that one or more attributes of the first digital currency transaction does not comprise the one or more prohibited attributes of the one or more restriction rules in the compliance certificate; and generate a transaction receipt after the execution of the first digital currency transaction, the transaction receipt including a compliance signature, which certifies the first digital currency transaction does not comprise the one or more prohibited attributes of the one or more restriction rules.

2. The system of claim 1, wherein the one or more attributes of at least one of the one or more digital currency transactions includes at least one of a first party, a second party, a first digital asset, and a second digital asset, and wherein the at least one of the one or more digital currency transactions identifies an exchange between the first digital asset associated with the first user and a second digital asset associated with the second user.

3. The system of claim 2, wherein the transaction receipt is transmitted to the first party and the second party when a digital currency transaction associated with both the first party and the second party has been executed.

4. The system of claim 1, wherein the computer executable instructions cause the processor to perform further operations to:

reject a second digital currency transaction of the one or more transactions in response to determining that one or more attributes of the second digital currency transaction comprise the one or more prohibited attributes of at least one of the one or more restrictions rules; and transmit a fraud notification to the issuing authority indicating that the second digital currency transaction has been successfully blocked.

5. The system of claim 4, wherein the computer executable instructions cause the processor to perform further operations to:

receive an updated compliance certificate from the issuing authority, wherein the updated compliance certificate includes one or more updated restriction rules and one or more updated digital fingerprints, wherein each of the one or more updated restriction rules comprise one or more updated prohibited attributes, wherein each of the one or more updated digital fingerprints comprises a third hash of a corresponding updated restriction rule of the one or more updated restriction rules calculated using a third hash function, and wherein at least one of the one or more updated restriction rules are different from the one or more restriction rules.

6. The system of claim 5, wherein the computer executable instructions cause the processor to perform further operations to: determine that the one or more attributes of the first digital currency transaction comprise the one or more updated prohibited attributes of at least one of the one or more updated restriction rules.

7. The system of claim 5, wherein the computer executable instructions cause the processor to perform further operations to: determine that the one or more attributes of the second digital currency transaction does not comprise the one or more updated prohibited attributes of the one or more updated restriction rules.

8. A non-transitory computer-readable medium including computer-executable instructions that, when executed by a computing device, causes the computing device to:

receive a compliance certificate from an issuing authority, the compliance certificate comprising one or more restriction rules associated with digital currency transactions using blockchains and one or more digital fingerprints, wherein each of the one or more restriction rules comprises one or more prohibited attributes, wherein each of the one or more digital fingerprints comprises a first hash of a corresponding restriction rule of the one or more restriction rules calculated using a first hash function, the compliance certificate being encrypted using an encryption key for the issuing authority;

authenticate the compliance certificate based on decryption of the compliance certificate using a decryption key corresponding to the encryption key for the issuing authority;

calculate a second hash of each of the one or more restriction rules using a second hash function;

compare the second hash of each of the one or more restriction rules with the first hash comprised in the digital fingerprint of the corresponding restriction rule;

in response to determining that the second hash of at least one of the one or more restriction rules fails to match the first hash comprised in the digital fingerprint of the corresponding restriction rule, reject the compliance certificate;

in response to determining that each second hash of the one or more restriction rules matches each of the first hash comprised in the digital fingerprint of the corresponding restriction rule, process one or more digital currency transactions based on the compliance certificate, comprising:

receive requests to execute the one or more digital currency transactions, wherein each of the one or more digital currency transactions includes one or more attributes;

execute a first digital currency transaction of the one or more digital currency transactions in response to determining that one or more attributes of the first digital currency transaction does not comprise the one or more prohibited attributes of the one or more restriction rules in the compliance certificate; and generate a transaction receipt after the execution of the first digital currency transaction, the transaction receipt including a compliance signature, which certifies the first digital currency transaction does not comprise the one or more prohibited attributes of the one or more restriction rules.

9. The non-transitory computer-readable medium of claim 8, wherein the compliance certificate further includes a private key for the issuing authority, and wherein the computer executable instructions cause the processor to perform further operations to:

digitally sign the transaction receipt using the private key included in the compliance certificate.

10. The non-transitory computer-readable medium of claim 8, wherein the encryption key for the issuing authority comprises a private key of the issuing authority, wherein the computer executable instructions to authenticate the compliance certificate comprises computer executable instructions to cause the computing device to perform further operations to:

authenticate the compliance certificate using a public key corresponding to the private key of the issuing authority.

11. The non-transitory computer-readable medium of claim 8, wherein the compliance signature comprises one or more compliance signed rules corresponding to the one or more restriction rules, wherein each of the one or more compliance signed rules comprises a third hash of the corresponding restriction rule using a third hash function, wherein the compliance signature is signed using a private key of the issuing authority.

12. The non-transitory computer-readable medium of claim 11, wherein the third hash function is different from the first hash function.

13. The non-transitory computer-readable medium of claim 12, wherein at least one of the first hash function and the third hash function are generated using a hashing algorithm from one of the following hashing algorithm families: MD5, SHA-0, SHA-1, SHA-2, and Keccak including SHA-3.

14. A computerized method for authenticating compliance certificates time, the method comprising:

receiving a compliance certificate from an issuing authority, the compliance certificate comprising one or more restriction rules associated with digital currency transactions using blockchains and one or more digital fingerprints, wherein each of the one or more restriction rules comprises one or more prohibited attributes, wherein each of the one or more digital fingerprints comprises a first hash of a corresponding restriction rule of the one or more restriction rules calculated using a first hash function, the compliance certificate being encrypted using an encryption key for the issuing authority;

authenticating the compliance certificate based on decryption of the compliance certificate using a decryption key corresponding to the encryption key for the issuing authority;

calculating a second hash of each of the one or more restriction rules using a second hash function;

comparing the second hash of each of the one or more restriction rules with the first hash comprised in the digital fingerprint of the corresponding restriction rule;

in response to determining that the second hash of at least one of the one or more restriction rules fails to match the first hash comprised in the digital fingerprint of the corresponding restriction rule, rejecting the compliance certificate;

in response to determining that each second hash of the one or more restriction rules matches each of the first hash comprised in the digital fingerprint of the corresponding restriction rule, processing one or more digital currency transactions based on the compliance certificate, comprising:

receiving requests to execute the one or more digital currency transactions, wherein each of the one or more digital currency transactions includes one or more attributes;

executing a first digital currency transaction of the one or more digital currency transactions in response to determining that one or more attributes of the first digital currency transaction does not comprise the one or more prohibited attributes of the one or more restriction rules in the compliance certificate; and generating a transaction receipt after the execution of the first digital currency transaction, the transaction receipt including a compliance signature, which certifies the first digital currency transaction does not comprise the one or more prohibited attributes of the one or more restriction rules.

15. The computerized method of claim 14, wherein the issuing authority is a regulatory government agency, a self-regulating organization, or a private company.

16. The computerized method of claim 14, wherein the one or more restrictions rules prevent transactions with at least one of entities associated with one or more particular countries, entities associated with one or more particular digital addresses of a digital wallet, one or more tokens, one or more currencies, and one or more financial instruments.

17. The computerized method of claim 14, wherein the compliance certificate further includes at least one of an entity to whom the compliance certificate is being issued, public key associated with the entity, private key associated with the entity, domain name associated with the entity, subdomains associated with the entity, issuing authority who is issuing the compliance certificate, digital signature of the issuing authority, issue date of the compliance certificate, and expiry date of the compliance certificate.

18. The computerized method of claim 14, wherein the issuing authority regulates two or more market exchanges, wherein the issuing authority issues unique compliance certificates to each of the two or more market exchanges, and wherein each of the issued unique compliance certificates includes the same one or more restriction rules.

19. The system of claim 1, wherein the computer executable instructions cause the processor to perform further operations to: reject the first digital currency transaction in response to determining that the one or more attributes of the first digital currency transaction comprise the one or more prohibited attributes of at least one of the one or more restriction rules.

* * * * *